(12) United States Patent  
Sugiyama et al.

(10) Patent No.: US 12,410,314 B2  
(45) Date of Patent: Sep. 9, 2025

(54) RESIN COMPOSITION AND MOLDED BODY

(71) Applicant: SUMITOMO CHEMICAL COMPANY, LIMITED, Tokyo (JP)

(72) Inventors: Takayuki Sugiyama, Tsukuba (JP); Tasuku Tamura, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 749 days.

(21) Appl. No.: 17/633,036

(22) PCT Filed: Apr. 16, 2020

(86) PCT No.: PCT/JP2020/016711  
§ 371 (c)(1),  
(2) Date: Feb. 4, 2022

(87) PCT Pub. No.: WO2021/029109  
PCT Pub. Date: Feb. 18, 2021

(65) Prior Publication Data  
US 2022/0267591 A1 Aug. 25, 2022

(30) Foreign Application Priority Data  
Aug. 9, 2019 (JP) ................................ 2019-148160

(51) Int. Cl.  
*C08L 67/02* (2006.01)

(52) U.S. Cl.  
CPC ......... *C08L 67/02* (2013.01); *C08L 2205/025* (2013.01); *C08L 2207/04* (2013.01)

(58) Field of Classification Search  
CPC ............... C08L 67/02; C08L 2205/025; C08L 2207/04; C08L 67/00; C08K 7/14  
See application file for complete search history.

(56) References Cited

U.S. PATENT DOCUMENTS

| | | | |
|---|---|---|---|
| 5,866,648 A | 2/1999 | Saito et al. | |
| 2001/0025074 A1* | 9/2001 | Saito | C08L 23/142 524/505 |
| 2002/0190239 A1* | 12/2002 | Kitayama | C08G 63/065 252/299.01 |
| 2010/0271268 A1 | 10/2010 | Hosoda et al. | |
| 2011/0040022 A1 | 2/2011 | Goda et al. | |
| 2011/0124789 A1* | 5/2011 | Choi | C08K 3/04 977/788 |

(Continued)

FOREIGN PATENT DOCUMENTS

| | | |
|---|---|---|
| CN | 102529251 A | 7/2012 |
| CN | 105246941 A | 1/2016 |

(Continued)

OTHER PUBLICATIONS

Machine translation of JP 2745685 (Year: 1998).*

(Continued)

*Primary Examiner* — Doris L Lee  
(74) *Attorney, Agent, or Firm* — Rimon P.C.

(57) ABSTRACT

A resin composition comprising resin pellets comprising a first thermoplastic resin and glass fibers, and a second thermoplastic resin, in which the second thermoplastic resin has a lower flow starting temperature than the resin pellets, and a denier of the glass fibers is 500 g/1000 m or more and 3400 g/1000 m or less.

9 Claims, 1 Drawing Sheet

(56) References Cited

U.S. PATENT DOCUMENTS

| | | |
|---|---|---|
| 2012/0164316 A1 | 6/2012 | Kondo et al. |
| 2012/0217678 A1 | 8/2012 | Komatsu et al. |
| 2015/0073068 A1* | 3/2015 | Komatsu ............... B29C 48/395 524/451 |
| 2017/0260346 A1 | 9/2017 | Hirata et al. |
| 2020/0079919 A1* | 3/2020 | Tsuchigane ............. C03C 3/087 |

FOREIGN PATENT DOCUMENTS

| | | | |
|---|---|---|---|
| CN | 106661242 A | | 5/2017 |
| EP | 0 856 536 A2 | | 8/1998 |
| JP | 01-286824 A | | 11/1989 |
| JP | 03-013305 A | | 1/1991 |
| JP | 03-243648 A | | 10/1991 |
| JP | 05-185426 A | | 7/1993 |
| JP | 06-246742 A | | 9/1994 |
| JP | 06-262622 A | | 9/1994 |
| JP | 07-330917 A | | 12/1995 |
| JP | 10-77350 A | | 3/1998 |
| JP | 2745685 B2 | * | 4/1998 |
| JP | 11-080546 A | | 3/1999 |
| JP | 2000-309060 A | | 11/2000 |
| JP | 2003-321598 A | | 11/2003 |
| JP | 2007-161898 A | | 6/2007 |
| JP | 2007-308619 A | | 11/2007 |
| JP | 2009-051885 A | | 3/2009 |
| JP | 2009-074043 A | | 4/2009 |
| JP | 2011-012206 A | | 1/2011 |
| JP | 2015-063641 A | | 4/2015 |
| JP | 2018-127563 A | | 8/2018 |
| JP | 2019-108543 A | | 7/2019 |
| JP | 6694998 B1 | | 5/2020 |
| WO | 01/059009 A1 | | 8/2001 |
| WO | 2009/116608 A1 | | 9/2009 |
| WO | 2016/021479 A1 | | 2/2016 |
| WO | WO-2017171101 A1 | * | 10/2017 ............. C03C 13/00 |

OTHER PUBLICATIONS

Taiwanese Office Action issued in corresponding Taiwanese Patent Application No. 109112792, dated Aug. 31, 2023, with English translation.

Extended European Search Report issued in corresponding European Patent Application No. 20852815.8-1102, dated Jul. 13, 2023.

Shuidong Zhang, et al., "Effect of Screw Type on the Rheological, Mechanical and Thermal Properties of Recycled Glass Fiber Reinforced LCP", Polymer materials science and Engineering, vol. 29, No. 8, Aug. 31, 2013, pp. 126-130, with English Abstract.

Matti Koponen, et al., "Advanced Injection Molding Mold and Molding Process for Improvement of Weld Line Strengths and Isotropy of Glass Fiber Filled Aromatic Polyester LCP", Polymer Engineering and Science, vol. 48, Issue 4, Dec. 31, 2008, pp. 711-716.

First Office Action received in corresponding Chinese Patent Application No. 202080055563.4, dated Apr. 9, 2024.

Japanese Notice of Reasons for Refusal issued in corresponding Japanese Patent Application No. 2019-148160, dated Oct. 29, 2019, with English translation.

International Search Report issued in corresponding International Patent Application No. PCT/JP2020/016711, dated Jun. 30, 2020, with English translation.

* cited by examiner

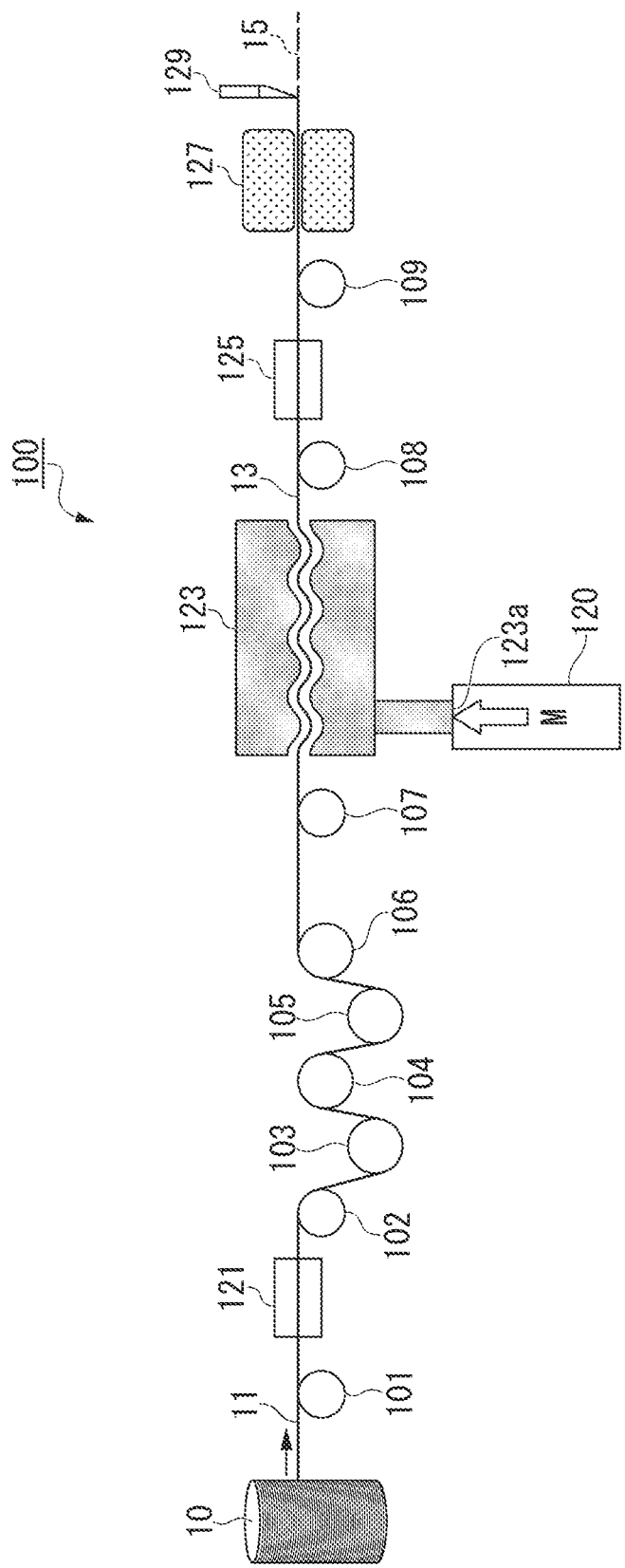

RESIN COMPOSITION AND MOLDED BODY

CROSS REFERENCE TO RELATED APPLICATIONS

This application is the U.S. National Phase under 35 U.S.C. § 371 of International Application No. PCT/JP2020/016711, filed on Apr. 16, 2020, which claims the benefit of Japanese Application No. 2019-148160, filed on Aug. 9, 2019, the entire contents of each are hereby incorporated by reference.

TECHNICAL FIELD

The present invention relates to a resin composition and a molded article produced using the resin composition.

BACKGROUND ART

In recent years, in the field of transportation equipment including automobiles and aircraft, the weight reduction of parts is being pursued for the purpose of improving fuel efficiency. In order to reduce the weight of parts, the use of resin materials instead of the current metal materials for the materials of each part is being considered. For example, using a thermoplastic resin as a molding material for frame members, suspension members, impact absorbing members, and the like for automobiles makes it possible to obtain lightweight automobiles compared to the current products.

However, there is a problem in that molded articles obtained from the thermoplastic resins described above have inferior mechanical properties to molded articles obtained from metal materials.

In the related art, in order to improve the strength of molding materials such as thermoplastic resin compositions, a method for mixing fibers into a thermoplastic resin as a filler was proposed (for example, refer to Patent Document 1).

CITATION LIST

Patent Document

Patent Document 1
  Japanese Unexamined Patent Application, First Publication No. H10-77350

SUMMARY OF INVENTION

Technical Problem

There is a demand for further weight reduction in the molding of molded articles that account for a large proportion of the weight of vehicle bodies, such as frame members, suspension members, and impact absorbing members for automobiles. However, as the weight of the molded articles is further reduced, securing the molded article strength becomes a problem.

With respect to this problem, the previous methods of simply mixing fibers as fillers into a thermoplastic resin do not obtain the necessary molded article strength.

In addition, generally, for injection-molded products obtained from thermoplastic resin compositions, when a fibrous filler is used as a filler, the ratio of filler oriented in the MD direction (flow direction) is increased due to the shear force during injection molding, thus, the mechanical strength in the MD direction is high, but the mechanical strength in the TD direction (direction perpendicular to the flow) is low, meaning that there is also a problem with MDTD anisotropy in the mechanical strength.

The present invention was made in consideration of the above circumstances and has an object of providing a resin composition able to reduce MDTD anisotropy in molded article strength and a molded article produced using the resin composition.

Solution to Problem

In order to solve the above problem, the present invention adopted the following configurations.

[1] A resin composition comprising resin pellets including a first thermoplastic resin and glass fibers, and a second thermoplastic resin, in which the second thermoplastic resin has a lower flow starting temperature than the resin pellets, and a denier of the glass fibers in the resin pellets is 500 g/1000 m or more and 3400 g/1000 m or less.

[2] The resin composition according to [1], in which a content of the glass fibers is more than 35 parts by mass and less than 65 parts by mass with respect to a total amount (100 parts by mass) of the resin pellets and the second thermoplastic resin.

[3] The resin composition according to [1] or [2], in which a content of the second thermoplastic resin is 10 parts by mass to 45 parts by mass with respect to a total amount (100 parts by mass) of the resin pellets and the second thermoplastic resin.

[4] The resin composition according to any one of [1] to [3], in which the first thermoplastic resin and the second thermoplastic resin are both liquid crystal polyester resins.

[5] The resin composition according to any one of [1] to [4], in which a length weighted average fiber length of the glass fibers is 5 mm to 20 mm

[6] The resin composition according to any one of [1] to [5], in which a number-average fiber diameter of the glass fibers is 10 μm to 20 μm.

[7] A resin composition comprising resin pellets including a first thermoplastic resin and glass fibers, and a second thermoplastic resin, in which, when a Charpy impact strength test with a notch is performed on a molded article having a width of 10 mm, a length of 80 mm, and a thickness of 4 mm and produced using the resin composition, a ratio ($TD_i/MD_i$) of an impact strength in an MD direction ($MD_i$) and an impact strength in a TD direction ($TD_i$) is 0.5 or more.

[8] A molded article produced using the resin composition according to any one of [1] to [7].

Advantageous Effects of Invention

According to the present invention, it is possible to reduce MDTD anisotropy in molded article strength.

BRIEF DESCRIPTION OF DRAWINGS

FIG. 1 is a schematic diagram showing an example of a resin pellet manufacturing apparatus.

DESCRIPTION OF EMBODIMENTS (Resin Composition)

The resin composition of the present embodiment contains resin pellets including a first thermoplastic resin and glass fibers, and a second thermoplastic resin.

Here, the form of the resin composition is not particularly limited and may be a mixture of resin pellets including the first thermoplastic resin and glass fibers and a second thermoplastic resin in powder-form or pellet-form; a pellet-form product in which the resin pellets are coated with the second thermoplastic resin; an injection-molded product in which the mixture or pellet-form product is injection molded, or the like.

<Resin Pellets Including First Thermoplastic Resin and Glass Fibers>

The resin pellets including the first thermoplastic resin and glass fibers in the present embodiment (also referred to below as "resin pellets") are, for example, resin pellets in which a melt obtained by melting and kneading the first thermoplastic resin and other components as necessary is impregnated in the glass fibers and pelletized, in which the glass fibers are in a state of being hardened by the first thermoplastic resin.

The flow starting temperature of the resin pellets in the present embodiment is preferably 250° C. or higher, and more preferably 260° C. or higher.

In addition, the flow starting temperature of the resin pellets in the present embodiment is preferably 400° C. or lower and more preferably 380° C. or lower.

For example, the flow starting temperature of the resin pellets in the present embodiment is preferably 250° C. or higher and 400° C. or lower, more preferably 260° C. or higher and 400° C. or lower, and even more preferably 260° C. or higher and 380° C. or lower.

The higher the flow starting temperature of the resin pellets, the higher the heat resistance and strength of the molded article produced using the resin composition containing the resin pellets tend to be.

On the other hand, when the flow starting temperature of the resin pellets is more than 400° C., the melting temperature and melting viscosity of the resin pellets tend to increase. Therefore, the temperature necessary for molding the resin composition containing the resin pellets tends to increase.

In the present specification, the flow starting temperature (the flow starting temperature of the resin pellets or the liquid crystal polyester resin) is also referred to as the flow temperature or flowing temperature, and is a temperature which is a guide for the molecular weight of the thermoplastic resin (thermoplastic resin included in the resin pellets) (Naoyuki Koide, "Liquid Crystal Polymer-Synthesis, Molding, and Applications" CMC Corporation, Jun. 5, 1987, refer to page 95).

As a method for measuring the flow starting temperature, specifically, the flow starting temperature is the temperature at which the viscosity is 4800 Pa·s (48000 poise) when resin pellets or a thermoplastic resin are melted using a capillary rheometer while the temperature is raised at a rate of 4° C./min under a load of 9.8 MPa (100 kg/cm$^2$) and extruded from a nozzle with an inner diameter of 1 mm and a length of 10 mm.

Using a ball mill type freeze-grinder (JFC-1500, manufactured by Japan Analytical Industry), the resin pellets are freeze-ground before the measurement under the following conditions and the flow starting temperature is measured.

Pellet introduction amount: 5 g
Pre-freezing time: 10 min
Freeze-grinding time: 10 min <<First Thermoplastic Resin>>

Examples of the first thermoplastic resin included in the resin pellets in the present embodiment include polyolefin resins such as polyethylene, polypropylene, polybutadiene, and polymethylpentene; vinyl-based resins such as vinyl chloride, vinylidene chloride vinyl acetate, and polyvinyl alcohol; polystyrene-based resins such as polystyrene, acrylonitrile-styrene resins (AS resins), and acrylonitrile-butadiene-styrene resins (ABS resins); polyamide-based resins such as polyamide 6 (nylon 6), polyamide 66 (nylon 66), polyamide 11 (nylon 11), polyamide 12 (nylon 12), polyamide 46 (nylon 46), polyamide 610 (nylon 610), polytetramethylene terephthalamide (nylon 4T), polyhexamethylene terephthalamide (nylon 6T), polymetaxylylene adipamide (nylon MXD6), polynonamethylene terephthalamide (nylon 9T), and polydecamethylene terephthalamide (nylon 10T); polyester-based resins such as polyethylene terephthalate, polyethylene naphthalate, polybutylene terephthalate, and polytrimethylene terephthalate; polysulfone-based resins such as modified polysulfone, polyethersulfone, polysulfone, and polyphenylsulfone; polyphenylene sulfides such as linear polyphenylene sulfide, cross-linked polyphenylene sulfide, and semi-cross-linked polyphenylene sulfide, polyetherketones such as polyetherketone, polyetheretherketone, and polyetherketoneketone; polycarbonate; polyphenylene ether; polyimide-based resins such as thermoplastic polyimides, polyamide-imides, and polyetherimides, and the like.

As the first thermoplastic resin in the present embodiment, among the above, from the viewpoint of the impact strength of the molded article produced using the resin composition containing the resin pellets, polypropylene or a liquid crystal polyester resin (also referred to below as "the first liquid crystal polyester resin") is preferable and, from the viewpoint of flowability, heat resistance and dimensional accuracy, a liquid crystal polyester resin is more preferable.

First Liquid Crystal Polyester Resin

The first liquid crystal polyester resin may be any polyester resin which exhibits liquid-crystal-properties in a molten state and is not particularly limited, but the resin preferably melts at a temperature of 400° C. or lower. The first liquid crystal polyester resin in the present embodiment may be a liquid crystal polyester amide, a liquid crystal polyester ether, a liquid crystal polyester carbonate, a liquid crystal polyester imide, or the like.

The first liquid crystal polyester resin in the present embodiment is preferably a fully aromatic liquid crystal polyester formed using only aromatic compounds as raw material monomers.

Typical examples of the first liquid crystal polyester resin in the present embodiment include resins formed by polymerization (polycondensation) of an aromatic hydroxycarboxylic acid, an aromatic dicarboxylic acid, and at least one compound selected from the group consisting of an aromatic diol, an aromatic hydroxyamine, and an aromatic diamine; resins formed by polymerization of a plurality of types of aromatic hydroxycarboxylic acids; resins formed by polymerization of an aromatic dicarboxylic acid and at least one compound selected from the group consisting of an aromatic diol, an aromatic hydroxyamine, and an aromatic diamine;

and resins formed by polymerization of a polyester such as polyethylene terephthalate and an aromatic hydroxycarboxylic acid.

Here, aromatic hydroxycarboxylic acids, aromatic dicarboxylic acids, aromatic diols, aromatic hydroxyamines, and aromatic diamines may each independently be partially or fully substituted, and polymerizable derivatives thereof may be used.

Examples of polymerizable derivatives of compounds having a carboxyl group, such as aromatic hydroxycarboxylic acids and aromatic dicarboxylic acids, include derivatives (esters) formed by converting a carboxyl group to an alkoxycarbonyl group or an aryloxycarbonyl group; derivatives (acid halides) formed by converting a carboxyl group to a haloformyl group; derivatives (acid anhydrides) formed by converting a carboxyl group to an acyloxycarbonyl group, and the like.

Examples of polymerizable derivatives of compounds having a hydroxyl group, such as aromatic hydroxycarboxylic acids, aromatic diols, and aromatic hydroxyamines, include derivatives (acylates) formed by acylating a hydroxyl group for conversion to an acyloxyl group, and the like.

Examples of polymerizable derivatives of compounds having an amino group, such as aromatic hydroxyamines and aromatic diamines, include derivatives (acylates) formed by acylating an amino group for conversion to an acylamino group, and the like.

The first liquid crystal polyester resin in the present embodiment preferably has a repeating unit represented by Formula (1) (also referred to below as "repeating unit (1)"), and more preferably has the repeating unit (1), a repeating unit represented by Formula (2) (also referred to below as "repeating unit (2)"), and a repeating unit represented by Formula (3) (also referred to below as "repeating unit (3)").

—O—Ar¹—O—R—      (1)

—CO—Ar²—CO—      (2)

—X—Ar³—Y—      (3)

[In the formula, $Ar^1$ represents a phenylene group, a naphthylene group, or a biphenylylene group. $Ar^2$ and $Ar^3$ each independently represent a phenylene group, naphthylene group, biphenylylene group, or a group represented by Formula (4). X and Y each independently represent an oxygen atom or an imino group (—NH—). The hydrogen atoms in the groups represented by $Ar^1$, $Ar^2$, or $Ar^3$ may each independently be substituted with a halogen atom, an alkyl group, or an aryl group.]

—Ar⁴—Z—Ar⁵—      (4)

[In the formula, $Ar^4$ and $Ar^5$ each independently represent a phenylene group or a naphthylene group. Z represents an oxygen atom, a sulfur atom, a carbonyl group, a sulfonyl group, or an alkylidene group.]

Examples of halogen atoms able to be substituted with one or more hydrogen atoms in the group represented by $Ar^1$, $Ar^2$, or $Ar^3$ include fluorine atoms, chlorine atoms, bromine atoms, and iodine atoms.

Examples of alkyl groups able to be substituted with one or more hydrogen atoms in the groups represented by $Ar^1$, $Ar^2$, or $Ar^3$ include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group, an n-decyl group, and the like and the number of carbon atoms thereof is preferably 1 to 10.

Examples of aryl groups able to be substituted with one or more hydrogen atoms in the groups represented by $Ar^1$, $Ar^2$, or $Ar^3$ include a phenyl group, an o-tolyl group, an m-tolyl group, a p-tolyl group, a 1-naphthyl group, a 2-naphthyl group, and the like and the number of carbon atoms thereof is preferably 6 to 20.

When the hydrogen atoms in the groups represented by $Ar^1$, $Ar^2$, or $Ar^3$ are substituted with the groups described above, the number of substitutions is preferably one or two and more preferably one.

Examples of the alkylidene group in Z in Formula (4) include a methylene group, an ethylidene group, an isopropylidene group, an n-butylidene group, a 2-ethylhexylidene group, and the like and the number of carbon atoms thereof is preferably 1 to 10.

The repeating unit (1) is a repeating unit derived from a predetermined aromatic hydroxycarboxylic acid. As the repeating unit (1), repeating units in which $Ar^1$ is a 1,4-phenylene group (a repeating unit derived from p-hydroxybenzoic acid) and repeating units in which $Ar^1$ is a 2,6-naphthylene group (a repeating unit derived from 6-hydroxy-2-naphthoic acid) are preferable.

In the present specification, the term "derived from" means that the chemical structure of the functional groups contributing to the polymerization of the raw material monomer is changed due to the polymerization of the monomer and that no other structural changes occur.

The repeating unit (2) is a repeating unit derived from a predetermined aromatic dicarboxylic acid. As the repeating unit (2), repeating units in which $Ar^2$ is a 1,4-phenylene group (a repeating unit derived from terephthalic acid), repeating units in which $Ar^2$ is a 1,3-phenylene group (a repeating unit derived from isophthalic acid), repeating units in which $Ar^2$ is a 2,6-naphthylene group (a repeating unit derived from 2,6-naphthalene dicarboxylic acid), and repeating units in which $Ar^2$ is a diphenyl ether-4,4'-diyl group (a repeating unit derived from diphenyl ether-4,4'-dicarboxylic acid) are preferable.

The repeating unit (3) is a repeating unit derived from a predetermined aromatic diol, aromatic hydroxylamine, or aromatic diamine. As the repeating unit (3), repeating units in which $Ar^3$ is a 1,4-phenylene group (a repeating unit derived from hydroquinone, p-aminophenol, or p-phenylenediamine) and repeating units in which $Ar^3$ is a 4,4'-biphenylylene group (a repeating unit derived from 4,4'-dihydroxybiphenyl, 4-amino-4'-hydroxybiphenyl, or 4,4'-diaminobiphenyl) are preferable.

The content of the repeating unit (1) is preferably 30 mol % or more with respect to the total amount of all the repeating units (a value obtained by determining the amount (moles) equivalent to the substance amount of each repeating unit by dividing the mass of each repeating unit forming the liquid crystal polyester resin by the formula amount of each repeating unit, and then taking the results in total), more preferably 30 mol % or more and 80 mol % or less, even more preferably 40 mol % or more and 70 mol % or less, and particularly preferably 45 mol % or more and 65 mol % or less.

The content of the repeating unit (2) is preferably 35 mol % or less with respect to the total amount of all the repeating units, more preferably 10 mol % or more and 35 mol % or less, even more preferably 15 mol % or more and 30 mol % or less, and particularly preferably 17.5 mol % or more and 27.5 mol % or less.

The content of the repeating unit (3) is preferably 35 mol % or less with respect to the total amount of all the repeating units, more preferably 10 mol % or more and 35 mol % or less, even more preferably 15 mol % or more and 30 mol % or less, and particularly preferably 17.5 mol % or more and 27.5 mol % or less.

When the first liquid crystal polyester resin in the present embodiment is formed of the repeating units (1) to (3) described above, the sum of the content of the repeating unit (1) of the liquid crystal polyester, the content of the repeating unit (2) of the liquid crystal polyester, and the content of the repeating unit (3) of the liquid crystal polyester is not more than 100 mol %.

The higher the content of the repeating unit (1), the easier it is to improve the melt flowability, heat resistance, strength, and rigidity, but when the content is excessively high, the melting temperature and melting viscosity tends to increase easily and the temperature necessary for molding tends to increases.

The ratio of the content of the repeating unit (2) to the content of the repeating unit (3), expressed as [content of repeating unit (2)]/[content of repeating unit (3)] (mole/mole), is preferably 0.9/1 to 1/0.9, more preferably 0.95/1 to 1/0.95, and even more preferably 0.98/1 to 1/0.98.

The first liquid crystal polyester resin in the present embodiment may each independently have two or more of the repeating units (1) to (3). In addition, the first liquid crystal polyester resin may have repeating units other than the repeating units (1) to (3), but the content of the repeating units is preferably 10 mol % or less with respect to the total amount of all the repeating units, and more preferably 5 mol % or less.

For the first liquid crystal polyester resin in the present embodiment, having a repeating unit in which X and Y are each oxygen atoms as the repeating unit (3), that is, having a repeating unit derived from a predetermined aromatic diol, is preferable since the melting viscosity is easily lowered, and having only a repeating unit in which X and Y are each oxygen atoms as the repeating unit (3) is more preferable.

The first thermoplastic resin in the present embodiment is preferably manufactured by melt polymerization of raw material monomers corresponding to the repeating units forming the resin and solid phase polymerization of the obtained polymer. Due to this, it is possible to manufacture high-molecular-weight thermoplastic resins with high heat resistance, strength, and rigidity with a good operation.

The melt polymerization may be performed in the presence of a catalyst. Examples of this catalyst include metal compounds such as magnesium acetate, first tin acetate, tetrabutyl titanate, lead acetate, sodium acetate, potassium acetate, and antimony trioxide, and nitrogen-containing heterocyclic compounds such as 4-(dimethylamino)pyridine and 1-methylimidazole, and nitrogen-containing heterocyclic compounds are preferably used.

The first thermoplastic resin in the present embodiment may be used alone as one type or may be used in a combination of two or more types.

The content of the first thermoplastic resin in the present embodiment is preferably 10 parts by mass or more with respect to the total amount (100 parts by mass) of the resin pellets, more preferably 20 parts by mass or more, and even more preferably 25 parts by mass or more.

In addition, the content of the first thermoplastic resin in the present embodiment is preferably 80 parts by mass or less with respect to the total amount (100 parts by mass) of the resin pellets, more preferably 60 parts by mass or less, and even more preferably 45 parts by mass or less.

For example, the content of the first thermoplastic resin in the present embodiment is preferably 10 parts by mass to 80 parts by mass with respect to the total amount (100 parts by mass) of the resin pellets, more preferably 20 parts by mass to 60 parts by mass, and even more preferably 25 parts by mass to 45 parts by mass.

The content of the first thermoplastic resin in the present embodiment is preferably 5 parts by mass or more with respect to the total amount (100 parts by mass) of the resin composition in the present embodiment, more preferably 10 parts by mass or more, and even more preferably 15 parts by mass or more.

In addition, the content of the first thermoplastic resin in the present embodiment is preferably 60 parts by mass or less with respect to the total amount (100 parts by mass) of the resin composition in the present embodiment, more preferably 50 parts by mass or less, and even more preferably 40 parts by mass or less.

For example, the content of the first thermoplastic resin in the present embodiment is preferably 5 parts by mass to 60 parts by mass with respect to the total amount (100 parts by mass) of the resin composition in the present embodiment, more preferably 10 parts by mass to 50 parts by mass, and even more preferably 15 parts by mass to 40 parts by mass.

<<Glass Fibers>>

The type of glass fibers in the present embodiment is not particularly limited and it is possible to use any known glass fibers and examples thereof include E-glass (that is, alkali-free glass), C-glass (that is, glass for acid-resistant applications), AR-glass (that is, glass for alkali-resistant applications), S-glass, T-glass, or the like.

Among the above, the glass fibers are preferably E-glass.

The glass fibers may be unprocessed or may be processed.

It is possible to perform processes on the glass fibers with sizing-agents, silane coupling agents, boron compounds, and the like. Examples of sizing-agents include aromatic urethane-based sizing-agents, aliphatic urethane-based sizing-agents, acrylic sizing-agents, and the like.

The denier of the glass fibers in the resin pellets in the present embodiment is 500 g/1000 m or more and preferably 800 g/1000 m or more.

The denier of the glass fibers in the resin pellets in the present embodiment is 3400 g/1000 m or less, preferably 2500 g/1000 m or less, and more preferably 1500 g/1000 m or less.

For example, the denier of the glass fibers in the resin pellets in the present embodiment is preferably 800 g/1000 m or more and 2500 g/1000 m or less and more preferably 800 g/1000 in or more and 1500 g/1000 in or less.

In the present specification, "denier" means the thickness (thickness of a fiber bundle) as a bundle when the glass fibers are aligned in one direction.

In general, the fiber orientation of injection-molded products is layered and takes the form of three main layers, which are the central section of the molded product (core layer), the layer positioned on both sides thereof (shell layer), and the molded product surface layer (skin layer).

In a case of injection molding a plate-shaped molded product using a film gate or the like provided on one side of the plate-shaped molded product, the fibers are oriented in the MD direction in the shell layer due to shear flow in the thickness direction and oriented randomly or in the TD direction in the core layer.

When the glass fibers in the resin pellets have a high degree of denier, in the molding step, since the glass fibers are maintained as the fiber bundle state in the resin pellets so as to be present even in the molded product, the higher the denier in the resin pellets is, the thicker the fiber bundles which remain in the molded product are.

On the other hand, in the molding step, the glass fibers are maintained as the fiber bundle state in the resin pellets are oriented in the MD direction due to the shear flow in the thickness direction in the shell layer, thus, when the denier of the glass fibers in the resin pellets is excessively high, that is, when the fiber bundle of the glass fibers is excessively thick, the ratio of the shell layer in which the glass fibers are oriented in the MD direction is high and there is no room to form the core layer and skin layer in which the glass fibers are oriented randomly or in the TD direction, thus, the fiber orientation of the glass fibers in the MD direction is stronger and the MDTD anisotropy of the molded article strength is larger.

That is, when the range of the denier of the glass fibers in the resin pellets is the lower limit value described above or more, in the molding step, the glass fibers are maintained as the fiber bundle state in the resin pellets and are present in the molded article, thus, the glass fibers remain in the molded article in a thicker fiber bundle state and the mechanical strength (in particular, the impact strength) of the molded article is further improved.

When the range of the denier of the glass fibers is the upper limit value described above or less, in the molding step, the orientation of the glass fibers in the MD direction is suppressed, it is possible to form a core layer in which the glass fibers are oriented randomly or in the TD direction, and it is possible to reduce the MDTD anisotropy of the mechanical strength of the molded article.

It is possible to calculate the denier of the glass fibers in the resin pellets by performing calculation by taking out only the glass fibers in the resin pellets and measuring the weight and the number-average fiber length thereof, assuming that the weight per number-average fiber length is known for the glass fibers in the resin pellets.

Specifically, the calculation is carried out using the following procedures.

Procedure (a); The resin pellet weight per 100 resin pellets is measured with a precision balance to a 0.1 mg unit. Thereafter, the resin pellets are heated at 600° C. for 4 hours in a muffle furnace to remove the resin content (first thermoplastic resin).

Procedure (b); The resin content is removed from the resin pellets, only the glass fibers are extracted, and a total weight A of the glass fibers is measured with a precision balance to a 0.1 mg unit. Thereafter, the glass fibers for which the total weight is measured are dispersed in 1000 mL of an aqueous solution containing 0.05% by volume of a surfactant (Micro 90, manufactured by International Products Corporation) to prepare a glass fiber dispersion solution.

Procedure (c); 100 mL is extracted from the dispersion solution and diluted to 5 times to 20 times with pure water. 50 mL is extracted from the diluted dispersion solution and dispersed in a Petri dish, then, the glass fibers dispersed in the Petri dish are observed with a microscope (VH-Z25, manufactured by Keyence Corporation, magnification 10 times to 20 times), and 10 images thereof are taken 10 images per sample are taken without overlaps of taken areas.

Procedure (d); The lengths of all the glass fibers present in one taken image are measured with the measuring tool of the microscope. The bent glass fibers are measured by multi-point measurement and fibers contacting the edge of the image are not measured. The fiber length of the glass fibers is measured by sequentially performing the same operation on the 10 taken images until the total number of glass fibers measured is more than 500. When the total number of glass fibers in the 10 taken images is not more than 500, returning to Procedure (c), the dilution ratio with pure water is appropriately adjusted and the images are re-taken to re-measure the fiber length.

Procedure (e); From the fiber length of the glass fibers measured in Procedure (d), the number-average fiber length $Lm=(\Sigma Li \times ni)/\Sigma ni$ is determined ($\Sigma ni>500$).

Li: Fiber length of glass fibers ni: Number of glass fibers with fiber length Li Procedure (f); It is possible to calculate the denier described above from the total weight A of glass fibers determined by Procedure (b), the number-average fiber length Lm of the glass fibers determined by Procedure (e), and 100 resin pellets used in the measurement.

$$\text{Denier(unit:g/1000 m)}=1000\times 1000 \text{(unit:m)}/Lm\text{(unit:mm)} \times A\text{(unit:g)}/100$$

The glass fibers in the resin pellets in the present embodiment preferably have a length weighted average fiber length of 4 mm or more, more preferably a length weighted average fiber length of 4.5 mm or more, even more preferably a length weighted average fiber length of 5 mm or more, particularly preferably a length weighted average fiber length of 6 mm or more, and most preferably a length weighted average fiber length of 7 mm or more.

On the other hand, the glass fibers preferably have a length weighted average fiber length of less than 50 mm, more preferably a length weighted average fiber length of 40 mm or less, even more preferably a length weighted average fiber length of 20 mm or less, and particularly preferably a length weighted average fiber length of 15 mm or less.

For example, the length weighted average fiber length of the glass fibers is preferably 4 mm or more and less than 50 mm, more preferably 4.5 mm or more and 40 mm or less, even more preferably 5 mm or more and 20 mm or less, yet more preferably 5.5 mm or more and 15 mm or less, and particularly preferably 6 mm or more and 15 mm or less.

The length weighted average fiber length of the glass fibers being the lower limit value or more of the preferable ranges described above further improves the molded article strength. On the other hand, being the upper limit value or less of the preferable ranges described above makes it easier to carry out the molding.

In the present embodiment, the fiber length and length weighted average fiber length of the glass fibers are measured by the following procedures.

Procedure (1); 2 g of resin pellets are heated at 600° C. for 4 hours in a muffle furnace to remove the resin content (first thermoplastic resin).

Procedure (2); The resin content is removed from the resin pellets, only the glass fibers are taken out and are dispersed in 1000 mL of an aqueous solution containing 0.05% by volume of a surfactant (Micro 90, manufactured by International Products Corporation) to prepare a glass fiber dispersion solution.

Procedure (3); 100 mL is extracted from the dispersion solution and diluted to 5 times to 20 times with pure water. 50 mL is extracted from the dispersion solution after dilution and dispersed in a Petri dish, then, the glass fibers dispersed in the Petri dish are observed with a microscope (VH-Z25, manufactured by Keyence Corporation, magnification 10 times to 20 times), and 10 images per sample are taken without overlaps of taken areas.

Procedure (4); The lengths of all glass fibers present in one taken image are measured with the measuring tool of the microscope. Bent glass fibers are measured by multi-point measurement and the fibers contacting the edge of the image are not measured. The same operation is performed sequentially on the 10 taken images to measure the fiber length until the total number of glass fibers measured is more than 500. When the total number of glass fibers measured in the 10 taken images is not more than 500, returning to Procedure (3), the dilution ratio with pure water is appropriately adjusted and the images are re-taken to re-measure the fiber length.

Procedure (5); From the fiber length of the glass fibers measured in Procedure (4), the length weighted average fiber length 1 $m=(\Sigma li^2 \times ni)/(\Sigma li \times ni)$ is determined ($\Sigma ni > 500$).

li: Fiber length of glass fibers ni: Number of glass fibers with fiber length li The number-average fiber diameter of the glass fibers in the resin pellets is preferably 5 μm or more and more preferably 10 μm or more.

In addition, the number-average fiber diameter of the glass fibers in the resin pellets is preferably 35 μm or less, more preferably 25 μm or less, and even more preferably 20 μm or less.

For example, the number-average fiber diameter of the glass fibers in the resin pellets is preferably 5 μm to 35 μm, more preferably 10 μm to 25 μm, and even more preferably 10 μm to 20 μm.

When the number-average fiber diameter of the glass fibers in the resin pellets is the lower limit value or more of the preferable range described above, the glass fibers are easily dispersed in the resin pellets.

On the other hand, when the number-average fiber diameter of the glass fibers is the upper limit value or less of the preferable range described above, the strengthening of the molded article is efficiently performed by the glass fibers. Therefore, it is possible to further improve the molded article strength.

As the method for measuring the number-average fiber diameter of the glass fibers in the resin pellets, for example, it is possible to remove the resin content with the same method as in Procedure (1) for the fiber length and length weighted average fiber length of the glass fiber described above, to observe the obtained glass fibers under a scanning electron microscope (1000 times), and to adopt the number-average value of the values obtained by measuring the fiber diameter with regard to 500 randomly selected glass fibers.

For the resin pellets in the present embodiment, 100 parts by mass of the first thermoplastic resin are preferably impregnated in 80 parts by mass or more of glass fibers, more preferably 100 parts by mass or more of glass fibers, and even more preferably 120 parts by mass or more of glass fibers.

In addition, for the resin pellets in the present embodiment, 100 parts by mass of the first thermoplastic resin are preferably impregnated in 260 parts by mass or less of glass fibers, more preferably 250 parts by mass or less of glass fibers, and even more preferably 240 parts by mass or less of glass fibers.

For example, for the resin pellets in the present embodiment, 100 parts by mass of the first thermoplastic resin are preferably impregnated in 80 parts by mass to 260 parts by mass of glass fibers, more preferably 100 parts by mass to 250 parts by mass of glass fibers, and even more preferably 120 parts by mass to 240 parts by mass of glass fibers.

When the mass ratio of the first thermoplastic resin and the glass fibers is the lower limit value or more of the preferable range described above, the molded object strength is further improved. On the other hand, when the mass ratio is the upper limit value or less of the preferable range described above, the opening of the fiber bundle and impregnation of the first thermoplastic resin in the glass fibers is easy.

In the resin composition of the present embodiment, the content of the glass fibers described above is preferably more than 35 parts by mass with respect to the total amount (100 parts by mass) of the resin pellets and the second thermoplastic resin, more preferably 40 parts by mass or more, and even more preferably 45 parts by mass or more.

In addition, in the resin composition of the present embodiment, the content of the glass fibers described above is preferably less than 65 parts by mass with respect to the total amount (100 parts by mass) of the resin pellets and the second thermoplastic resin, more preferably 60 parts by mass or less, and even more preferably 55 parts by mass or less.

For example, in the resin composition of the present embodiment, the content of the glass fibers described above is preferably more than 35 parts by mass and less than 65 parts by mass with respect to the total amount (100 parts by mass) of the resin pellets and the second thermoplastic resin, more preferably 40 parts by mass or more and 60 parts by mass or less, and even more preferably 45 parts by mass or more and 55 parts by mass or less.

When the content of the glass fibers is the preferable upper limit value or less, the moldability is improved.

When the content of the glass fibers is the preferable lower limit value or more, it is possible to further improve the molded object strength.

The content of the glass fibers in the present embodiment is preferably 20 parts by mass or more with respect to the total amount (100 parts by mass) of the resin composition of the present embodiment, more preferably 30 parts by mass or more, and even more preferably 40 parts by mass or more.

In addition, the content of the glass fibers in the present embodiment is preferably 70 parts by mass or less with respect to the total amount (100 parts by mass) of the resin composition of the present embodiment, more preferably 65 parts by mass or less, and even more preferably 60 parts by mass or less.

For example, the content of the glass fibers in the present embodiment is preferably 20 parts by mass to 70 parts by mass with respect to the total amount (100 parts by mass) of the resin composition of the present embodiment, more preferably 30 parts by mass to 65 parts by mass, and even more preferably 40 parts by mass to 60 parts by mass.

<Second Thermoplastic Resin>

Examples of the second thermoplastic resin in the present embodiment are the same as exemplified for the first thermoplastic resin described above and the second thermoplastic resin has a lower flow beginning temperature than the resin pellets described above.

The flow starting temperature of the second thermoplastic resin in the present embodiment is preferably 250° C. or higher and more preferably 260° C. or higher.

In addition, the flow starting temperature of the second thermoplastic resin in the present embodiment is preferably 400° C. or lower and more preferably 380° C. or lower.

For example, the flow starting temperature of the second thermoplastic resin in the present embodiment is preferably 250° C. or higher and 400° C. or lower, more preferably 260° C. or higher and 400° C. or lower, and even more preferably 260° C. or higher and 380° C. or lower.

The higher the flow starting temperature of the second thermoplastic resin, the better the heat resistance and strength of the molded article produced using the resin composition containing the second thermoplastic resin tend to be.

On the other hand, when the flow starting temperature of the second thermoplastic resin is more than 400° C., the melting temperature and melting viscosity of the second thermoplastic resin tend to increase. Therefore, the temperature necessary for molding the resin composition containing the second thermoplastic resin tends to increase.

In the resin composition of the present embodiment, the difference in the flow starting temperatures between the resin pellets and the second thermoplastic resin (flow starting temperature of the resin pellets—flow starting temperature of the second thermoplastic resin) is preferably 10° C. or more, more preferably more than 10° C., even more preferably 15° C. or more, and particularly preferably 25° C. or more.

Due to the difference in the flow starting temperatures between the resin pellets and the second thermoplastic resin being the preferable lower limit value or more, during the processing process up to the production of the molded article, the resin pellets do not melt easily even at the molding temperature at which the second thermoplastic resin melts sufficiently, thus, the glass fibers may be maintained as a more bundled state in the resin pellets and to improve the molded article strength since the glass fibers are able to remain long. The upper limit value of the difference in the flow starting temperatures between the resin pellets and the second thermoplastic resin is not particularly limited and is, for example, 40° C.

For example, the difference in the flow starting temperatures between the resin pellets and the second thermoplastic resin is preferably 10° C. or more and 40° C. or less, more preferably more than 10° C. and 40° C. or less, even more preferably 15° C. or more and 40° C. or less, yet more preferably 20° C. or more and 40° C. or less, particularly preferably 25° C. or more and 40° C. or less, and most preferably 28° C. or more and 40° C. or less.

As the second thermoplastic resin in the present embodiment, a liquid crystal polyester resin (also referred to below as "the second liquid crystal polyester resin") is preferable among those exemplified in the first thermoplastic resin described above.

That is, in the resin composition of the present embodiment, the first thermoplastic resin and the second thermoplastic resin are both preferably liquid crystal polyester resins. The second liquid crystal polyester resin has a lower flow starting temperature than the first liquid crystal polyester resin (resin pellets including the first liquid crystal polyester resin).

For example, preferably, the flow starting temperature of the resin pellets in the present embodiment is 300° C. or higher and 400° C. or lower and the flow starting temperature of the second thermoplastic resin is 250° C. or higher and lower than 290° C., more preferably, the flow starting temperature of the resin pellets in the present embodiment is 300° C. or higher and 380° C. or lower and the flow starting temperature of the second thermoplastic resin is 260° C. or higher and lower than 290° C., and, even more preferably, the flow starting temperature of the resin pellets in the present embodiment is 300° C. or higher and 325° C. or lower and the flow starting temperature of the second thermoplastic resin is 270° C. or higher and lower than 290° C.

Specific examples of the second liquid crystal polyester resin are the same as for the first liquid crystal polyester resin described above and include a liquid crystal polyester resin having the repeating unit (1) and the like.

By appropriately selecting the types of raw material monomers and the content of each repeating unit described in the first liquid crystal polyester resin described above and by adjusting the molecular weight thereof, it is possible to manufacture a second liquid crystal polyester resin having a lower flow starting temperature than the resin pellets described above.

The second liquid crystal polyester resin in the present embodiment may be used alone as one type or in a combination of two or more types.

The content of the second thermoplastic resin in the present embodiment is preferably 5 parts by mass or more with respect to the total amount (100 parts by mass) of the resin pellets and the second thermoplastic resin described above, more preferably 10 parts by mass or more, and even more preferably 15 parts by mass or more.

In addition, the content of the second thermoplastic resin in the present embodiment is preferably 50 parts by mass or less with respect to the total amount (100 parts by mass) of the resin pellets and the second thermoplastic resin described above, more preferably 45 parts by mass or less, and even more preferably 40 parts by mass or less.

For example, the content of the second thermoplastic resin in the present embodiment is preferably 5 parts by mass to 50 parts by mass with respect to the total amount (100 parts by mass) of the resin pellets and the second thermoplastic resin described above, more preferably 10 parts by mass to 45 parts by mass, and even more preferably 15 parts by mass to 40 parts by mass.

When the content of the second thermoplastic resin is the preferable upper limit value or less, it is possible to further improve the molded article strength.

When the content of the second thermoplastic resin is the preferable lower limit value or more, the moldability is improved.

The content of the second thermoplastic resin in the present embodiment is preferably 5 parts by mass or more with respect to the total amount (100 parts by mass) of the resin composition of the present embodiment, more preferably 10 parts by mass or more, and even more preferably 15 parts by mass or more.

In addition, the content of the second thermoplastic resin in the present embodiment is preferably 50 parts by mass or less with respect to the total amount (100 parts by mass) of the resin composition of the present embodiment, more preferably 40 parts by mass or less, and even more preferably 30 parts by mass or less.

For example, the content of the second thermoplastic resin in the present embodiment is preferably 5 parts by mass to 50 parts by mass with respect to the total amount (100 parts by mass) of the resin composition of the present embodiment, more preferably 10 parts by mass to 40 parts by mass, and even more preferably 15 parts by mass to 30 parts by mass.

<Other Components>

In addition to the resin pellets and the second thermoplastic resin described above, the resin composition of the present embodiment may contain one or more metal salt of higher fatty acids, other fillers, additives, and the like, as necessary.

Specific examples of metal salt of higher fatty acids include lithium laurate, calcium laurate, barium laurate, lithium stearate, barium stearate, sodium stearate, potassium stearate, calcium stearate, aluminum stearate, magnesium behenate, calcium behenate, barium behenate, and the like.

Among the above, due to having a relatively low melting point and being able to be molded at lower temperatures, calcium behenate, magnesium behenate, and calcium stearate are preferable and magnesium behenate is more preferable.

The content of the metal salt of higher fatty acid in the present embodiment is preferably 0.01 parts by mass or more with respect to the total amount (100 parts by mass) of the resin pellets and the second thermoplastic resin described above, and more preferably 0.02 parts by mass or more.

In addition, the content of the metal salt of higher fatty acid in the present embodiment is preferably 0.15 parts by mass or less with respect to the total amount (100 parts by mass) of the resin pellets and the second thermoplastic resin described above, and more preferably 0.08 parts by mass or less.

For example, the content of the metal salt of higher fatty acid in the present embodiment is preferably 0.01 parts by mass to 0.15 parts by mass with respect to the total amount (100 parts by mass) of the resin pellets and the second thermoplastic resin described above, and more preferably 0.02 parts by mass to 0.08 parts by mass.

When the content of metal salt of higher fatty acid is the preferable lower limit value or more, the molded article strength (in particular, the impact strength) is further improved. In addition, the molding processability is further improved.

When the content of metal salt of higher fatty acids is the preferable upper limit value or less, decreases in molded article strength (in particular, the flexural strength and tensile strength) are suppressed. In addition, contamination of the mold to be used, blistering of the molded article, and the like tend to be less likely to occur.

The content of the metal salt of higher fatty acid in the present embodiment is preferably 0.02 parts by mass or more with respect to the total amount (100 parts by mass) of the resin composition of the present embodiment.

In addition, the content of the metal salt of higher fatty acid in the present embodiment is preferably 0.15 parts by mass or less with respect to the total amount (100 parts by mass) of the resin composition of the present embodiment, more preferably 0.12 parts by mass or less, and even more preferably 0.08 parts by mass or less.

For example, the content of the metal salt of higher fatty acid in the present embodiment is preferably 0.02 parts by mass to 0.15 parts by mass with respect to the total amount (100 parts by mass) of the resin composition of the present embodiment, more preferably 0.02 parts by mass to 0.12 parts by mass, and even more preferably 0.02 parts by mass to 0.08 parts by mass.

The other fillers may be plate-shaped fillers, spherical fillers, or other granular fillers. The other fillers may be inorganic fillers or may be organic fillers.

Examples of plate-shaped inorganic fillers include talc, mica, graphite, wollastonite, glass flakes, barium sulfate, and calcium carbonate. The mica may be potassium mica, magnesia mica, fluorine magnesia mica, or tetrasilicon mica.

Examples of granular inorganic fillers include silica, alumina, titanium dioxide, glass beads, glass balloons, boron nitride, silicon carbide, and calcium carbonate.

Examples of additives include flame retardants, conductivity imparting agents, crystal nucleating agents, UV absorbers, antioxidants, anti-vibration agents, antibacterial agents, insect repellents, deodorants, coloring inhibitors, heat stabilizers, mold release agents, antistatic agents, plasticizers, lubricants, colorants, pigments, dyes, foaming agents, antifoaming agents, viscosity modifiers, and surfactants.

In the resin composition of the present embodiment, the MDTD anisotropy of the molded article strength is reduced by the configuration described above. Therefore, for the resin composition of the present embodiment, when a Charpy impact strength test (with a notch) is performed on a molded article having a width of 10 mm, a length of 80 mm, and a thickness of 4 mm produced by injection molding using the resin composition described above, the ratio ($TD_i$/$MD_i$) of the impact strength in the MD direction ($MD_i$) to the impact strength in the TD direction ($TD_i$) is preferably 0.5 or more, more preferably 0.7 or more, and even more preferably 0.8 or more.

That is, one aspect of the resin composition of the present embodiment is a resin composition containing resin pellets including a first thermoplastic resin and glass fibers, and a second thermoplastic resin, in which, when a Charpy impact strength test (with a notch) is performed on a molded article having a width of 10 mm, a length of 80 mm, and a thickness of 4 mm produced by injection molding using the resin composition, a ratio ($TD_i$/$MD_i$) of an impact strength in an MD direction ($MD_i$) and an impact strength in a TD direction ($TD_i$) is 0.5 or more.

The resin composition of the present embodiment contains resin pellets and a second thermoplastic resin, in which the second thermoplastic resin has a lower flow starting temperature than the resin pellets and the denier of the glass fibers in the resin pellets is 500 g/1000 m or more and 3400 g/1000 m or less.

Among the above, in the resin composition of the present embodiment, preferably, the difference in flow starting temperature between the resin pellets and the second thermoplastic resin (flow starting temperature of the resin pellets—flow starting temperature of the second thermoplastic resin) is 10° C. or more and the denier of the glass fibers in the resin pellets is 800 g/1000 m or more and 2500 g/1000 m or less.

In addition, in the resin composition of the present embodiment, more preferably, the difference in flow starting temperature between the resin pellets and the second thermoplastic resin (flow starting temperature of the resin pellets—flow starting temperature of the second thermoplastic resin) is more than 10° C. and the denier of the glass fibers in the resin pellets is 800 g/1000 m or more and 1500 g/1000 m or less.

In addition, in the resin composition of the present embodiment, even more preferably, the difference in flow starting temperature between the resin pellets and the second thermoplastic resin (flow starting temperature of the resin pellets—flow starting temperature of the second thermoplastic resin) is 15° C. or more and the denier of the glass fibers in the resin pellets is 800 g/1000 in or more and 1500 g/1000 in or less.

In addition, in the resin composition of the present embodiment, particularly preferably, the difference in flow starting temperature between the resin pellets and the second thermoplastic resin (flow starting temperature of the resin pellets—flow starting temperature of the second thermoplastic resin) is 25° C. or more and the denier of the glass fibers in the resin pellets is 800 g/1000 in or more and 1500 g/1000 in or less.

In addition, for example, in the resin composition of the present embodiment, the difference in flow starting temperature between the resin pellets and the second thermoplastic resin (flow starting temperature of the resin pellets—flow starting temperature of the second thermoplastic resin) may be 27° C. or more and the denier of the glass fibers in the resin pellets may be 1180 g/1000 m or more and 2300 g/1000 m or less.

As described above, the resin composition of the present embodiment contains the resin pellets and the second thermoplastic resin. Additionally, the denier of the glass fibers included in the resin pellets is 500 g/1000 m or more and 3400 g/1000 m or less. That is, in the present embodiment, it is presumed that, by using a combination of the resin pellets and the second thermoplastic resin for which the denier of the glass fibers included in the resin pellets is in a specific range and the flow starting temperatures are different, the breakage of the glass fibers included in the resin pellets during molding may be reduced, and the orientation of the glass fibers in the MD direction may be suppressed, thereby reducing the MDTD anisotropy of the molded article strength.

The present invention has the following aspects.

[1] A resin composition including resin pellets including a first thermoplastic resin and glass fibers, and a second thermoplastic resin, in which
a denier of the glass fibers in the resin pellets is 500 g/1000 m or more and 3400 g/1000 m or less,
the flow starting temperatures of the resin pellets and the second thermoplastic resin are both 250° C. or higher and 400° C. or lower, and
the difference in flow starting temperature between the resin pellets and the second thermoplastic resin (flow starting temperature of the resin pellets—flow starting temperature of the second thermoplastic resin) is 10° C. or more and 40° C. or less.

[2] The resin composition according to [1], in which, in the resin pellets, 100 parts by mass of the first thermoplastic resin are preferably impregnated in 80 parts by mass to 260 parts by mass of glass fibers, more preferably 100 parts by mass to 250 parts by mass of glass fibers, and even more preferably 120 parts by mass to 240 parts by mass of glass fibers,
the content of the glass fibers is preferably more than 35 parts by mass and less than 65 parts by mass with respect to the total amount (100 parts by mass) of the resin pellets and the second thermoplastic resin, more preferably 40 parts by mass or more and 60 parts by mass or less, and even more preferably 45 parts by mass or more and 55 parts by mass or less, and
the content of the second thermoplastic resin is preferably 5 parts by mass to 50 parts by mass with respect to the total amount (100 parts by mass) of the resin pellets and the second thermoplastic resin, more preferably 10 parts by mass to 45 parts by mass, and even more preferably 15 parts by mass to 40 parts by mass.

[3] The resin composition according to [1] or [2], in which the length weighted average fiber length of the glass fibers is preferably 4 mm or more and less than 50 mm, more preferably 4.5 mm or more and 40 mm or less, even more preferably 5 mm or more and 20 mm or less, yet more preferably 5.5 mm or more and 15 mm or less, and particularly preferably 6 mm or more and 15 mm or less.

[4] The resin composition according to any one of [1] to [3], in which the number-average fiber diameter of the glass fibers is preferably 5 μm to 35 μm, more preferably 10 μm to 25 μm, and even more preferably 10 μm to 20 μm.

[5] The resin composition according to [1], in which, when a Charpy impact strength test (with a notch) is performed on a molded article having a width of 10 mm, a length of 80 mm, and a thickness of 4 mm produced by injection molding using the resin composition, a ratio ($TD_i/MD_i$) of an impact strength in an MD direction ($MD_i$) and an impact strength in a TD direction ($TD_i$) is preferably 0.5 or more, more preferably 0.7 or more, and even more preferably 0.8 or more.

(Method for Manufacturing Resin Composition)

It is possible to manufacture the resin composition of the present embodiment by mixing the resin pellets, the second thermoplastic resin, and other components described above as necessary.

[Method for Manufacturing Resin Pellets]

In the method for manufacturing resin pellets in the present embodiment, for example, it is possible to obtain the resin pellets by melting and kneading the first thermoplastic resin and other components as necessary, impregnating the obtained melt in glass fibers, and carrying out pelletizing.

FIG. 1 shows an embodiment of a resin pellet manufacturing apparatus.

In the present embodiment shown in FIG. 1, a description will be given of a case of obtaining resin pellets 15 using a fiber roving 10 in which a fiber bundle 11 in which a plurality of glass fibers are made to converge with a sizing-agent is rolled up into a roll.

As shown in FIG. 1, a manufacturing apparatus 100 is provided with a pre-heating section 121, an impregnation section 123, a cooling section 125, a take-up section 127, a cutting section 129, and transport rolls 101 to 109. In the manufacturing apparatus 100 shown in FIG. 1, an extruder 120 is connected to the impregnation section 123.

FIG. 1 shows a state in which the fiber bundle 11 is continuously unrolled from the fiber roving 10. In the present embodiment, the resin pellets 15 are produced while the fiber bundle 11 unrolled from the fiber roving 10 is transported in the longitudinal direction by the transport rolls 101 to 109.

The denier of the fiber roving 10 used in the manufacturing of the resin pellets in the present embodiment is 500 g/1000 m or more and 3400 g/1000 m or less, preferably 800 g/1000 m or more and 3200 g/1000 m or less, and more preferably 800 g/1000 m or more and 2400 g/1000 m or less.

When the denier of the fiber roving 10 is the lower limit value or more of the preferable range described above, the fiber roving 10 is easy to handle in the method for manufacturing resin pellets.

When the denier of the fiber roving 10 is the upper limit value or less of the preferable range described above, the fibers are easily dispersed in the first thermoplastic resin. In addition, the fibers are easy to handle during the manufacturing of the resin pellets.

The number-average fiber diameter of the fiber roving 10 is preferably 5 μm to 35 μm, more preferably 10 μm to 25 μm, and even more preferably 10 μm to 20 μm.

As the number-average fiber diameter of the fiber roving 10, the glass fibers are observed by a scanning electron microscope (1000 times) and the number-average value of a value measuring the fiber diameter for 500 randomly selected glass fibers is adopted.

When the number-average fiber diameter of the fiber roving 10 is the lower limit value or more of the preferable range described above, the glass fibers are easily dispersed in the resin pellets. In addition, the glass fibers are easy to handle during the manufacturing of the resin pellets. On the other hand, when the value is the upper limit value or less of the preferable range described above, strengthening of the molded article by the glass fibers is performed efficiently. Therefore, it is possible to improve the molded article strength.

In the present embodiment, the fiber roving 10 which is used is processed with a sizing-agent. Glass fibers which are appropriately subjected to sizing processing have excellent productivity and quality stability during pellet production and are able to reduce the variation of physical properties in molded articles.

Sizing-agents are not particularly limited and examples thereof include nylon-based polymers, polyether-based polymers, epoxy-based polymers, ester-based polymers, urethane-based polymers, mixed polymers thereof or modified polymers of each of the above. In addition, it is also possible to use known coupling agents such as so-called silane coupling agents such as amino silane and epoxy silane, and titanium coupling agents.

The glass fibers used in the resin pellets of the present embodiment do not necessarily require the single fibers be arranged in one direction, but from the viewpoint of productivity in the process of manufacturing the molding material, a state in which the single fibers are arranged in one direction and the fiber bundle is continuous over the length direction of the fibers is preferable.

From the viewpoint of economy and impregnation improvement, the number of single fibers in the fiber roving 10 is preferably 1000 or more and 10000 or less, more preferably 1000 or more and 8000 or less, and even more preferably 1500 or more and 6000 or less.

In the pre-heating section 121, the fiber bundle 11 to be unrolled from the fiber roving 10 is dried by heating. The heating temperature at that time is not particularly limited, but is, for example, 50° C. to 250° C. In addition, the heating time in the pre-heating section 121 is not particularly limited and is, for example, 3 seconds to 30 seconds.

In the impregnation section 123, a molding material M (the first thermoplastic resin and other components as necessary to be blended) other than the fiber bundle 11 is impregnated in the fiber bundle 11.

The first thermoplastic resin is appropriately selected in consideration of the type of the second thermoplastic resin, melting viscosity, flow starting temperature, and the like, as described below.

One type of the first thermoplastic resin may be used alone, or two or more types may be used in combination.

The molding material M may be introduced from a supply port 123a and the melt obtained by heating in the impregnation section 123 may be impregnated in the fiber bundle 11, or the molding material M melted and kneaded in the extruder 120 may be introduced from the supply port 123a to be impregnated in the fiber bundle 11.

Then, in the embodiment shown in FIG. 1, a resin structure 13 is obtained in which the melt is impregnated in and coated on the fiber bundle 11.

The heating temperature in the impregnation section 123 is appropriately determined according to the type of the first thermoplastic resin and is preferably set at a temperature 10° C. to 80° C. higher than the flow starting temperature of the first thermoplastic resin used, for example, 300° C. to 400° C.

In the impregnation section 123, depending on the characteristics and the like demanded for the molded article, 100 parts by mass of the first thermoplastic resin are preferably impregnated in 80 parts by mass to 260 parts by mass of glass fibers (fiber bundle 11), more preferably 100 parts by mass to 250 parts by mass of glass fibers, and even more preferably 120 parts by mass to 240 parts by mass of glass fibers.

When the blending amount of the glass fibers is the lower limit value or more of the preferable range described above, the molded article strength is further improved. On the other hand, when the amount is the upper limit value or less of the preferable range described above, the opening of the fiber bundle and impregnation of the first thermoplastic resin in the fiber bundle is easy.

Changing the nozzle diameter of a die head at an outlet of the impregnation section 123 with respect to the diameter of the fiber bundle 11 makes it possible to adjust the blending ratio of the first thermoplastic resin and the glass fibers in the resin structure 13.

In the cooling section 125, the resin structure 13 in a state of being heated in the impregnation section 123 (the resin structure 13 in which the melt is impregnated in and coated on the fiber bundle) is cooled to, for example, 50° C. to 150° C. The cooling time is not particularly limited and is, for example, 3 seconds to 30 seconds.

In the take-up section 127, the resin structure 13 cooled in the cooling section 125 is continuously taken up and unrolled to the next cutting section 129.

In the cutting section 129, the resin structure 13 after cooling is cut to a desired length to produce the resin pellets 15. The cutting section 129 is provided with, for example, a rotary blade or the like.

Using the manufacturing apparatus 100 described above, as the resin pellets of the present embodiment, for example, pellets in which glass fibers are hardened with a first thermoplastic resin are manufactured as follows.

Step of Obtaining Resin Structure:

While continuously unrolling the fiber bundle 11, in which a plurality of single fibers are made to converge with a sizing-agent, from the fiber roving 10, first, the fiber bundle 11 is dried by heating in the pre-heating section 121.

Next, while supplying the fiber bundle 11 after drying to the impregnation section 123, the molding material M, which is melted and kneaded by the extruder 120, is introduced from the supply port 123a to impregnate the fiber bundle 11 with the molding material M in the molten state. Due to this, the resin structure 13 is obtained in which the melt is impregnated in and coated on the fiber bundle. Thereafter, the resin structure 13 in the heated state in the impregnation section 123 is cooled in the cooling section 125.

In the resin structure 13 obtained here, the fibers are arranged approximately in parallel to the longitudinal direction of the resin structure 13.

"The fibers are arranged approximately in parallel to the longitudinal direction of the resin structure" means that the angle between the longitudinal direction of the fibers and the longitudinal direction of the resin structure is approximately 0°, specifically, a state where the angle between the respective longitudinal directions of the fibers and the resin structure is −5° to 5°.

Step of Obtaining Pellets:

Next, the resin structure 13 after cooling is taken up in strand form at the take-up section 127 and unrolled to the cutting section 129.

Next, in the cutting section 129, the resin structure 13 in strand form is cut in the longitudinal direction at predetermined lengths to obtain the resin pellets 15.

Here, the predetermined length for the resin pellets 15 means the length of the resin pellets 15 set according to the performance demanded of the molded article for which the resin pellets 15 are the material. In the resin pellets obtained by the manufacturing method of the present embodiment, the length of the resin pellets 15 and the length of the fibers arranged in the resin pellets 15 are substantially the same lengths.

"The length of the pellets and the length of the fibers are substantially the same lengths" means that the length weighted average fiber length of the fibers arranged in the pellets is 95% to 105% of the length of the pellets in the longitudinal direction.

As described above, resin pellets (the resin pellets 15) including the first thermoplastic resin and glass fibers are manufactured.

In the resin pellets 15, the glass fibers are hardened with the first thermoplastic resin and the glass fibers are arranged to be approximately in parallel to the longitudinal direction of the pellets. In addition, the length of the glass fibers arranged in the resin pellets 15 is substantially the same length as the length of the pellets. The length of the resin pellets 15 manufactured in the present embodiment is, for example, 3 mm to 50 mm, depending on the performance or the like demanded of the molded article for which the resin pellets 15 are the material.

In this manner, the glass fibers are arranged to be approximately in parallel to the longitudinal direction of the pellets and the length of the glass fibers is substantially the same length as the length of the pellets, due to this, for example, it is possible for the remaining glass fibers in the injection-molded product to be made into long fibers when forming the injection-molded product, which is effective in improving the strength, improving the heat resistance, and for the anisotropic relaxation of the molded article.

It is possible to confirm the arrangement direction of the glass fibers in the resin pellets by observing the cross-section of the resin pellets cut in the longitudinal direction, with a microscope.

In addition, as the length of the glass fibers in the resin pellets, the length weighted average fiber length determined by the same procedure as the fiber length measurement of the glass fibers in the resin pellets described above is adopted.

[Method for Manufacturing Second Resin Pellets]

For the second thermoplastic resin, pellets (second resin pellets) including the second thermoplastic resin may be produced by pelletizing a mixture in which the second thermoplastic resin and other components as necessary are blended, using a melt extrusion molding method or a melt compression molding method. In addition, the difference in pellet length between the second resin pellets and the resin pellets 15 is preferably 15 mm or less and more preferably 5 mm or less.

The smaller the difference in pellet length between the second resin pellets and the resin pellets 15, the more effective the reduction of strength variation and the reduction of glass fiber filling amount variation in the molded articles produced using the resin composition containing the second resin pellets and the resin pellets 15.

In the manufacturing method of the present embodiment, mixing may be carried out after all components are added, mixing may be carried out while sequentially adding some of the components, or mixing may be carried out while sequentially adding all of the components. That is, the resin pellets and the second thermoplastic resin may be mixed from the beginning, or metal salt of higher fatty acids or the like may be added as necessary to a mixture of the resin pellets and the second thermoplastic resin. In addition, the metal salt of higher fatty acids or the like may be added as necessary to resin pellets coated with the second thermoplastic resin.

(Molded Article)

The molded article of the present embodiment is a molded article produced using the resin composition described above.

It is possible to obtain the molded article of the present embodiment by a known molding method using the resin composition. As a method for molding the resin composition of the present embodiment, a melt molding method is preferable and examples thereof include an injection molding method, an extrusion molding method such as a T-die method or an inflation method, a compression molding method, a blow molding method, a vacuum molding method, and press molding. Among the above, an injection molding method is preferable.

For example, when the resin composition described above is used as a molding material and molded by an injection molding method, the resin composition is melted using a known injection molding machine and the melted resin composition is molded by injection into a mold.

Here, when the resin composition is introduced into the injection molding machine, each component (resin pellets, second thermoplastic resin, and the like) may be introduced into the injection molding machine separately, or some or all of the components may be mixed in advance and introduced into the injection molding machine as a mixture.

Examples of known injection molding machines include TR450EH3 manufactured by Sodick Co., Ltd., the PS40E5ASE model hydraulic horizontal molding machine manufactured by Nissei Plastic Industrial Co., Ltd., and the like.

The temperature conditions for injection molding are appropriately determined according to the type of thermoplastic resin and it is preferable to set the cylinder temperature of the injection molding machine to a temperature 10° C. to 80° C. higher than the flow starting temperature of the thermoplastic resin to be used.

For example, the melting and kneading temperature (plasticizing section) is preferably higher than the flow starting temperature of the second thermoplastic resin described above and equal to or lower than the flow starting temperature of the first thermoplastic resin described above or the resin pellets described above. Specifically, the inciting and kneading temperature (plasticizing section) is preferably 250° C. to 350° C., more preferably 260° C. to 340° C., and even more preferably 270° C. to 320° C.

For the metering section or plunger section, 280° C. to 400° C. is preferable, 290° C. to 380° C. is more preferable, and 300° C. to 370° C. is even more preferable.

The temperature of the mold is preferably set in the range of room temperature (for example, 23° C.) to 180° C. in terms of the cooling speed and productivity of the resin composition.

Other injection conditions, such as the screw rotation speed, back pressure, injection speed, holding pressure, and holding pressure time, may be adjusted as appropriate.

The molded article of the present embodiment described above is able to be applied to any application to which a thermoplastic resin is applicable in general and is particularly suitable for applications in the automotive field.

Examples of applications in the automotive field include, as injection-molded articles for automobile interior materials, injection-molded articles for ceiling materials, injection-molded articles for wheelhouse covers, injection-molded articles for trunk compartment linings, injection-molded articles for instrument panel surface materials, injection-molded articles for steering wheel covers, injection-molded articles for armrests, injection-molded articles for headrests, injection-molded articles for seat belt covers, injection-molded articles for shift lever boots, injection-molded articles for console boxes, injection-molded articles for horn pads, injection-molded articles for knobs, injection-molded articles for airbag covers, injection-molded articles for various trims, injection-molded articles for various pillars, injection-molded articles for door lock bezels, injection-molded articles for grab boxes, injection-molded articles for defroster nozzles, injection-molded articles for scuff plates, injection-molded articles for steering wheels, injection-molded articles for steering column covers, and the like.

In addition, examples of applications in the automotive field include, as injection-molded articles for automobile exterior materials, injection-molded articles for bumpers, injection-molded articles for spoilers, injection-molded articles for mudguards, injection-molded articles for side moldings, injection-molded articles for door mirror housings, injection-molded articles for underbody shields, and the like.

Examples of other injection-molded articles for automobile parts include injection-molded articles for automobile headlamps, injection-molded articles for glass run channels, injection-molded articles for weather strips, injection-molded articles for hoses such as injection-molded articles for drain hoses and injection-molded articles for windshield washer tubes, injection-molded articles for tubes, injection-molded articles for rack and pinion boots, injection-molded articles for gaskets, injection-molded articles for bumper beams, injection-molded articles for crash boxes, injection-molded articles for various members, injection-molded articles for suspension systems, injection-molded articles for front end modules, injection-molded articles for radiator supports, injection-molded articles for back door interiors, and the like.

In addition, in addition to the above, it is also possible to apply the molded article of the present embodiment to applications such as sensors, LED lamps, connectors, sockets, resistors, relay cases, switches, coil bobbins, capacitors, variable condenser cases, optical pickups, oscillators, various terminal boards, transformers, plugs, printed circuit boards, tuners, speakers, microphones, headphones, small motors, magnetic head bases, power modules, semiconductors, liquid-crystal displays, FDD carriages, FDD chassis, motor brush holders, parabolic antennas, computer related parts, microwave oven parts, sound and voice equipment parts, lighting parts, air conditioner parts, office computer related parts, telephone and fax-related parts, and copier-related parts.

The molded article of the present embodiment described above uses the resin composition described above and thus the mechanical strength is improved and the MDTD anisotropy of the mechanical strength is reduced.

EXAMPLES

A more detailed description will be given of the present invention by means of specific Examples below. However, the present invention is not limited in any way to the Examples shown below.

[Flow Starting Temperature of Thermoplastic Resin]

For the thermoplastic resin (liquid crystal polyester resin) described below, the flow starting temperature was evaluated using a flow tester (CFT-500 model, manufactured by Shimadzu Corporation). Specifically, approximately 2 g of a thermoplastic resin (liquid crystal polyester resin) was filled into a capillary rheometer with a die of 1 mm inner diameter and 10 mm length. Next, when the filled thermoplastic resin (liquid crystal polyester resin) was extruded from the nozzle of the rheometer with a temperature increase of 4° C./min at a load of 9.8 MPa (100 kg/cm$^2$), the temperature at which the melting viscosity was 4,800 Pa·s (48,000 poise) was set as the flow starting temperature.

[Flow Starting Temperature of Resin Pellets]

For the resin pellets described below, the flow starting temperature was evaluated using a flow tester (CFT-500 model, manufactured by Shimadzu Corporation). Specifically, first, using a ball mill type freeze-grinder ("JFC-1500", manufactured by Japan Analytical Industry), the resin pellets were freeze-ground under predetermined conditions (resin pellet introduction amount: 5 g, pre-freezing time: 10 min, and freeze-grinding time: 10 min).

Next, the flow starting temperature of the resin pellets was measured in the same manner as in the above [Flow starting temperature of Thermoplastic Resin], except that the thermoplastic resin (liquid crystal polyester resin) was changed to the resin pellet freeze-ground material.

<Manufacturing of Neat Pellets>

Neat pellets (1) and (2) of processed liquid crystal polyester resin were manufactured, respectively.

<<Manufacturing of Neat Pellets (1)>>

Neat pellets (1) (LCP 1) were manufactured in the following manner.

p-hydroxybenzoic acid (994.5 g, 7.2 moles), 4,4'-dihydroxybiphenyl (446.9 g, 2.4 moles), terephthalic acid (299.0 g, 1.8 moles), isophthalic acid (99.7 g, 0.6 moles), and acetic anhydride (1347.6 g, 13.2 moles), and 0.9 g of 1-methylimidazole were placed in a reactor equipped with a stirrer, a torque meter, a nitrogen gas inlet pipe, a thermometer, and a reflux cooler and the inside of the reactor was thoroughly substituted with nitrogen gas. Thereafter, the temperature was raised from room temperature to 150° C. over 30 minutes under a stream of nitrogen gas and held at 150° C. to carry out refluxing for 1 hour. Next, 1-methylimidazole (0.9 g) was added thereto, the temperature was raised from 150° C. to 320° C. over 2 hours and 50 minutes while distilling off byproduct acetic acid and unreacted acetic anhydride, the point where an increase in torque was observed was set as the end of the reaction, the contents were extracted, and the results were cooled to room temperature. After grinding the obtained solids to a particle diameter of approximately 0.1 mm to 1 mm using a grinding machine, solid phase polymerization was performed under a nitrogen atmosphere by raising the temperature from room temperature to 250° C. over 1 hour, raising the temperature from 250° C. to 285° C. over 5 hours, and holding the temperature at 285° C. for 3 hours. After the solid phase polymerization, a powdered liquid crystal polyester resin was obtained by cooling.

Here, with respect to the total amount of all repeating units, the obtained liquid crystal polyester resin had 60 mol % of the repeating unit (1) in which $Ar^1$ is a 1,4-phenylene group, 15 mol % of the repeating unit (2) in which $Ar^2$ is a 1,4-phenylene group, 5 mol % of the repeating unit (2) in which $Ar^2$ is a 1,3-phenylene group, and 20 mol % of the repeating unit (3) in which $Ar^3$ is a 4,4'-biphenylylene group and the flow starting temperature thereof was 327° C.

The obtained powdered liquid crystal polyester resin was granulated in a twin-screw extruder (PMT47, manufactured by IKG Corporation) at a cylinder temperature of 320° C. to manufacture LCP 1. The flow starting temperature of the obtained LCP 1 was 316° C.

<<Manufacturing of Neat Pellets (2)>>

Neat pellets (2) (LCP 2) were manufactured as follows.

p-hydroxybenzoic acid (994.5 g, 7.2 moles), 4,4'-dihydroxybiphenyl (446.9 g, 2.4 moles), terephthalic acid (239.2 g, 1.44 moles), isophthalic acid (159.5 g, 0.96 moles), and acetic anhydride (1347.6 g, 13.2 moles) were charged in a reactor equipped with a stirrer, a torque meter, a nitrogen gas inlet pipe, a thermometer, and a reflux cooler, 1-methylimidazole (0.9 g) was added thereto, and the inside of the reactor was thoroughly substituted with nitrogen gas. Thereafter, the temperature was raised from room temperature to 150° C. over 30 minutes under a stream of nitrogen gas and held at 150° C. to carry out refluxing for 1 hour. Next, 0.9 g of 1-methylimidazole was added thereto, the temperature was raised from 150° C. to 320° C. over 2 hours and 50 minutes while distilling off byproduct acetic acid and unreacted acetic anhydride, the point where an increase in torque was observed was set as the end of the reaction, the contents were extracted, and the results were cooled to room temperature. After grinding the obtained solids to a particle diameter of approximately 0.1 mm to 1 mm using a grinding machine, solid phase polymerization was performed under a nitrogen atmosphere by raising the temperature from room temperature to 220° C. over 1 hour, raising the temperature from 220° C. to 240° C. over 0.5 hours, and holding the temperature at 240° C. for 10 hours. After the solid phase polymerization, a powdered liquid crystal polyester resin was obtained by cooling.

Here, with respect to the total amount of all repeating units, the obtained liquid crystal polyester resin had 60 mol % of the repeating unit (1) in which $Ar^1$ is a 1,4-phenylene group, 12 mol % of the repeating unit (2) in which $Ar^2$ is a 1,4-phenylene group, 8 mol % of the repeating unit (2) in which $Ar^2$ is a 1,3-phenylene group, and 20 mol % of the repeating unit (3) in which $Ar^3$ is a 4,4'-biphenylylene group and the flow starting temperature thereof was 291° C.

The obtained powdered liquid crystal polyester resin was granulated in a twin-screw extruder (PMT47, manufactured by IKG Corporation) at a cylinder temperature of 290° C. to manufacture LCP 2. The flow starting temperature of the obtained LCP 2 was 284° C.

<Manufacturing of Resin Pellets>

Resin pellets 1 to 5, in which a liquid crystal polyester resin was impregnated in glass fibers, were manufactured respectively.

Resin pellets 1 to 5 were manufactured as follows using the same manufacturing apparatus as the form shown in FIG. 1.

A GTS-40 type extruder (manufactured by PLABOR Research Laboratory of Plastics Technology Co., Ltd.) was used as the extruder 120. An EBD-1500A (manufactured by IMEX Corporation) was used as the belt-type take-up machine. The glass fibers described below were used as the glass fibers.

[Glass Fibers]

GF1: Glass fiber roving (E-glass, fiber diameter 11 μm, denier 1400 g/1000 m, manufactured by Nippon Electric Glass Co., Ltd.)

GF2: Glass fiber roving (E-Glass, fiber diameter 17 μm, denier 2300 g/1000 m, manufactured by Nippon Electric Glass Co., Ltd.)

GF3: Glass fiber roving (HME-Glass, fiber diameter 17 μm, denier 1180 g/1000 m, manufactured by Nitto Boseki Co., Ltd.)

GF4: Glass fiber roving (HME-glass, fiber diameter 17 μm, denier 3540 g/1000 m)

GF4 is a glass fiber roving formed by bundling three strands of GF3.

GF5: Glass fiber roving (E-glass and HME-glass, fiber diameter 17 μm, denier 3480 g/1000 m)

GF5 is a glass fiber roving formed by bundling GF2 and GF3.

<<Manufacturing of Resin Pellets 1>>

LCP 1 and LCP 2 described above were used as the neat pellets.

The resin structure 13 was obtained in which GF1: glass fiber roving (E-glass, fiber diameter 11 denier 1400 g/1000 m, manufactured by Nippon Electric Glass Co., Ltd.) was 156 parts by mass with respect to a total of 100 parts by mass of LCP 1 and LCP 2 (75 parts by mass for LCP 1 and 25 parts by mass for LCP 2). Specifically, manufacturing was carried out in the following manner Step of Obtaining Resin Structure:

While continuously unrolling the glass fiber bundle 11 from the glass fiber roving 10 at a take-up speed of 10 m/min by operating the belt-type take-up machine (the take-up section 127) described above, first, the glass fiber bundle 11 was dried by heating to 150° C. in the pre-heating section 121.

Next, while supplying the dried glass fiber bundle 11 into a die (the impregnation section 123) attached to the tip of the extruder 120, LCP 1 and LCP 2 in a molten state were introduced from the extruder 120 through the supply port 123a. The LCP 1 and LCP 2 were melted at 380° C. in the die (the impregnation section 123), impregnated in the glass fiber bundle 11, the strand diameter was adjusted using a die head with a nozzle diameter of 1.3 mm at the die (the impregnation section 123) outlet, and due to this, the resin structure 13 was obtained in which the glass fiber was 156 parts by mass with respect to a total of 100 parts by mass of LCP 1 and LCP 2 (75 parts by mass for LCP 1 and 25 parts by mass for LCP 2).

Here, in the obtained resin structure 13, the glass fibers were arranged approximately in parallel to the longitudinal direction of the first liquid crystal polyester resin layer.

Thereafter, the resin structure 13 in the heated state in the die (the impregnation section 123) was cooled to 150° C. or lower by the cooling section 125.

Step of Obtaining Pellets:

Next, the resin structure 13 after cooling was taken up in strand form by the belt-type take-up machine (the take-up section 127), unrolled to a pelletizer (the cutting section 129), and cut at a predetermined length (12 mm) in the longitudinal direction thereof to obtain the resin pellets 1 with a cylindrical shape.

The flow starting temperature of the resin pellets 1 was 311° C.

[Measurement of Length Weighted Average Fiber Length of Glass Fibers in Resin Pellets]

The resin pellets 1 were cut in the longitudinal direction and the cross-section obtained by cutting was observed with a microscope. As a result of the observation, it was confirmed that the arrangement direction of the glass fibers approximately matched the longitudinal direction of the resin pellets 1 and was approximately in parallel to the longitudinal direction of the resin pellets 1.

The length weighted average fiber length of the glass fibers in the resin pellets 1 was determined by the following procedures.

Procedure (1); 2 g of resin pellets were heated at 600° C. for 4 hours in a muffle furnace to remove the resin content (first thermoplastic resin).

Procedure (2); The resin content was removed from the resin pellets and the glass fibers alone were dispersed in 1000 mL of an aqueous solution containing 0.05% by volume of a surfactant (Micro 90, manufactured by International Products Corporation) to prepare a glass fiber dispersion solution.

Procedure (3); 100 mL was taken out from the dispersion solution and diluted to 10 times with pure water. 50 mL was taken out from the dispersion solution after dilution and dispersed in a Petri dish, then, the glass fibers dispersed in the Petri dish were observed with a microscope (VH-Z25, manufactured by Keyence Corporation, magnification 10 times), and 10 images were taken per sample such that the imaged regions did not overlap.

Procedure (4); The lengths of all the glass fibers present in one taken image were measured with the measuring tool of the microscope. Here, bent glass fibers were measured by multi-point measurement and fibers contacting the edge of the image were not measured. The same operation was performed sequentially with 10 taken images until the total number of glass fibers measured was more than 500 and the fiber length of the glass fibers was measured.

Procedure (5); From the fiber lengths of the glass fibers measured in Procedure (4), the length weighted average fiber length $1\ m=(\Sigma li^2 \times ni)/(\Sigma li \times ni)$ was determined ($\Sigma ni > 500$).

li: Fiber length of glass fibers
ni: Number of glass fibers with fiber length li As a result, the length weighted average fiber length of the glass fibers in the resin pellets 1 was the same as the length of the pellets (12 mm).

[Measurement of Denier of Glass Fibers in Resin Pellets]

In addition, the denier of the glass fibers in the resin pellets 1 was determined by the following procedures.

Procedure (a); The resin pellet weight per 100 resin pellets was measured with a precision balance to a 0.1 mg unit. Thereafter, the resin pellets were heated at 600° C. for 4 hours in a muffle furnace to remove the resin content (first thermoplastic resin).

Procedure (b); The resin content was removed from the resin pellets, only the glass fibers were taken out, and a total weight A of the glass fibers was measured with a precision balance to a 0.1 mg unit. Thereafter, the glass fibers for which the total weight was measured were dispersed in 1000 mL of an aqueous solution containing 0.05% by volume of a surfactant (Micro 90, manufactured by International Products Corporation) to prepare a glass fiber dispersion solution.

Procedure (c); 100 mL was taken out from the dispersion solution and diluted to 10 times with pure water. 50 mL was taken out from the dispersion solution after dilution and dispersed in a Petri dish, then, the glass fibers dispersed in the Petri dish were observed with a microscope (VH-Z25, manufactured by Keyence Corporation, magnification 10 times), and 10 images were taken such that the imaged regions did not overlap.

Procedure (d); The lengths of all the glass fibers present in one taken image were measured with the measuring tool of the microscope. Here, bent glass fibers were measured by multi-point measurement and fibers contacting the edge of the image were not measured. The same operation was performed sequentially with 10 taken images until the total number of glass fibers measured was more than 500 and the fiber length of the glass fibers was measured.

Procedure (e); From the fiber length of the glass fibers measured in Procedure (d), the number-average fiber length $Lm=(\Sigma Li \times ni)/\Sigma ni$ is determined ($\Sigma ni > 500$).

Li: Fiber length of glass fibers
ni: Number of glass fibers with fiber length Li Procedure (f); The denier of the glass fibers described above was calculated from the total weight A of glass fibers determined by Procedure (b), the number-average fiber length Lm of the glass fibers determined by Procedure (e), and 100 resin pellets used in the measurement.

Denier(unit:g/1000 m)=1000×1000(unit:m)/$Lm$(unit:mm)×$A$(unit:g)/100

As a result, the denier of the glass fibers in the resin pellets 1 was 1400 g/1000 m.

[Measurement of Number-Average Fiber Diameter of Glass Fibers in Resin Pellets]

The number-average fiber diameter of glass fibers in the resin pellets 1 was determined by the following procedures.

The resin content was removed from the resin pellets by the same method as in Procedure (1) for the length weighted average fiber length of glass fibers described above, the glass fibers obtained were observed under a scanning electron microscope (1000 times), and the number-average value of values of the fiber diameter measurements for 500 randomly selected glass fibers was adopted.

As a result, the number-average fiber diameter of the glass fibers in the resin pellets 1 was 11 μm.

<<Manufacturing of Resin Pellets 2>>

LCP 1 and LCP 2 described above were used as the neat pellets.

The resin structure 13 was obtained in which GF2: glass fiber roving (E-glass, fiber diameter of 17 μm, denier of 2300 g/1000 m, manufactured by Nippon Electric Glass Co., Ltd.) was 227 parts by mass with respect to a total of 100 parts by mass of LCP 1 and LCP 2 (75 parts by mass for LCP 1 and 25 parts by mass for LCP 2).

The strand diameter was adjusted using a die head with a nozzle diameter of 1.5 mm.

Other than the above, the resin pellets 2 with a cylindrical shape (length 12 mm) were obtained in the same manner as in the manufacturing of the resin pellets 1 described above.

The length weighted average fiber length of the glass fibers in the resin pellets 2 was the same as the length of the pellets (12 mm). The denier of the glass fibers in the resin pellets 2 was 2300 g/1000 m. The number-average fiber diameter of the glass fibers in the resin pellets 2 was 17 μm.

The flow starting temperature of the resin pellets 2 was 316° C.

<<Manufacturing of Resin Pellets 3>>

LCP 1 and LCP 2 described above were used as the neat pellets.

The resin structure 13 was obtained in which GF3: glass fiber roving (HME-glass, fiber diameter of 17 μm, denier of 1180 g/1000 m, manufactured by Nitto Bosch Co., Ltd.) was 192 parts by mass with respect to a total of 100 parts by mass of LCP 1 and LCP 2 (75 parts by mass for LCP 1 and 25 parts by mass for LCP 2).

The strand diameter was adjusted using a die head with a nozzle diameter of 1.1 mm.

Other than the above, the resin pellets 3 with a cylindrical shape (9 mm or 12 mm) were obtained in the same manner as in the manufacturing of the resin pellets 1 described above.

The length weighted average fiber length of the glass fibers in the resin pellets 3 was the same as the length of the pellets (9 mm or 12 mm) The denier of the glass fibers in the resin pellets 3 was 1180 g/1000 m. The number-average fiber diameter of the glass fibers in the resin pellets 3 was 17 μm.

The flow starting temperature of the resin pellets 3 was 314° C.

<<Manufacturing of Resin Pellets 4>>

LCP 1 and LCP 2 described above were used as the neat pellets.

The resin structure 13 was obtained in which GF4: glass fiber roving (HME-glass, fiber diameter 17 μm, denier 3540 g/1000 m) was 192 parts by mass with respect to a total of 100 parts by mass of LCP 1 and LCP 2 (75 parts by mass for LCP 1 and 25 parts by mass for LCP 2).

The strand diameter was adjusted using a die head with a nozzle diameter of 2.0 mm.

Other than the above, the resin pellets 4 with a cylindrical shape (length 12 mm) were obtained in the same manner as in the manufacturing of the resin pellets 1 described above.

The length weighted average fiber length of the glass fibers in the resin pellets 4 was the same as the length of the pellets (12 mm). The denier of the glass fibers in the resin pellets 4 was 3540 g/1000 m. The number-average fiber diameter of the glass fibers in the resin pellets 4 was 17 μm.

The flow starting temperature of the resin pellets 4 was 312° C.

<<Manufacturing of Resin Pellets 5>>

LCP 1 and LCP 2 described above were used as the neat pellets.

The resin structure 13 was obtained in which GF5: glass fiber roving (E-glass and HME-glass, fiber diameter 17 μm, denier 3480 g/1000 m) was 161 parts by mass with respect to a total of 100 parts by mass of LCP 1 and LCP 2 (75 parts by mass for LCP 1 and 25 parts by mass for LCP 2).

The strand diameter was adjusted using a die head with a nozzle diameter of 2.0 mm.

Other than the above, the resin pellets 5 with a cylindrical shape (length 12 mm) were obtained in the same manner as in the manufacturing of the resin pellets 1 described above.

The length weighted average fiber length of the glass fibers in the resin pellets 5 was the same as the length of the pellets (12 mm). The denier of the glass fibers in the resin pellets 5 was 3480 g/1000 m. The number-average fiber diameter of the glass fibers in the resin pellets 5 was 17 μm.

The flow starting temperature of the resin pellets 5 was 311° C.

The compositions of the resin pellets 1 to 5, the number-average fiber diameters of the glass fibers in the resin pellets, and the denier of the glass fibers in the resin pellets are shown in Table 1.

<Manufacturing of Molded Articles>

Examples 1 to 4, Comparative Examples 1 to 2

The resin compositions of each example were produced by mixing the respective components shown in Tables 2 and 3 and the respective molded articles (injection-molded products) were manufactured by a step of injection molding the resin compositions.

Specifically, each of the components shown in Tables 2 and 3 was mixed and introduced into the hopper of a TR450EH3 injection molding machine (manufactured by Sodick Co., Ltd.), respectively. Melting and kneading was carried out in the injection molding machine at a melting and kneading temperature (plasticizing section) of 300° C. and injection was carried out into the mold at a mold temperature of 100° C. at an injection speed of 20 mm/sec to mold a flat plate-shaped molded product of 150 mm×150 mm×4 mm in thickness. The gate was a film gate with a thickness of 4 mm from one side of the flat plate-shaped molded product.

Other injection conditions: plunger section 360° C., screw rotation speed (plasticizing section) 100 rpm, back pressure 1 MPa, holding pressure 100 MPa, and holding pressure time 5 seconds.

Each of the abbreviations in Tables 2 and 3 have the following meanings.

Metal salt of higher fatty acids
  S1: Magnesium behenate (melting point: 117° C., manufactured by Nitto Chemical Industry Co., Ltd.)

The melting points of the metal salt of higher fatty acids described above were measured using a differential scanning calorimeter (DSC-50, manufactured by Shimadzu Corporation). The position of the highest temperature side endothermic peak appearing when the temperature of the metal salt of higher fatty acid was raised at a rate of 10° C./min was set as the melting point of the metal salt of higher fatty acid.

[Measurement of Length Weighted Average Fiber Length of Glass Fibers in Molded Products]

Procedure (1); A test piece having a width of 20 mm, a length of 20 mm, and a thickness of 4 mm was cut out from the central section of a flat plate-shaped molded product (150 mm×150 mm×4 mm) and heated at 600° C. for 4 hours in a muffle furnace to remove the resin content.

TABLE 1

|  |  |  | Resin pellets | | | | |
|---|---|---|---|---|---|---|---|
|  |  |  | Resin pellets 1 | Resin pellets 2 | Resin pellets 3 | Resin pellets 4 | Resin pellets 5 |
| First liquid crystal polyester resin | LCP1 | Parts by mass | 75 | 75 | 75 | 75 | 75 |
|  | LCP2 | Parts by mass | 25 | 25 | 25 | 25 | 25 |
| Glass fibers | GF1 | Parts by mass | 156 |  |  |  |  |
|  | GF2 | Parts by mass |  | 227 |  |  |  |
|  | GF3 | Parts by mass |  |  | 192 |  |  |
|  | GF4 | Parts by mass |  |  |  | 192 |  |
|  | GF5 | Parts by mass |  |  |  |  | 161 |
| Number-average fiber diameters of glass fibers in resin pellets | | μm | 11 | 17 | 17 | 17 | 17 |
| Denier of glass fibers in resin pellets | | g/1000 m | 1400 | 2300 | 1180 | 3540 | 3480 |

Procedure (2); The resin content was removed from the flat plate-shaped molded product and the glass fibers alone were dispersed in 1000 mL of an aqueous solution containing 0.05% by volume of a surfactant (Micro 90, manufactured by International Products Corporation) to prepare a dispersion solution.

Procedure (3); 100 mL was extracted from the dispersion solution and diluted to 15 times with pure water. 50 mL was extracted from the dispersion solution after dilution and dispersed in a Petri dish, then, the glass fibers dispersed in the Petri dish were observed with a microscope (VH-ZST (manufactured by Keyence Corporation), magnification 20 times), and 10 images were taken per sample such that the imaged regions did not overlap.

Procedure (4); The lengths of all fibers present in one taken image are measured with the measuring tool of the microscope. Here, bent fibers are measured by multi-point measurement. The same operation was performed sequentially with 10 taken images until the total number of measured fibers was more than 500 and the fiber length was measured.

Procedure (5); From the fiber lengths of the glass fibers measured in Procedure (4), the length weighted average fiber length $1\text{ m}=(\Sigma l_i^2 \times n_i)/(\Sigma l_i \times n_i)$ of the glass fibers in the molded products was determined ($\Sigma n_i > 500$).

li: Fiber length of glass fibers
ni: Number of glass fibers with fiber length li
The results are shown in Tables 2 and 3.

[Flexural Strength of Molded Products in MD Direction]
Production of Test Pieces for Evaluation of Molded Products in MD Direction A 120 mm×120 mm portion of the central section of the above flat plate-shaped molded product was used and cut into a shape having a width of 10 mm, a length of 80 mm, and a thickness of 4 mm such that the longitudinal direction was MD and 10 plate-shaped test pieces (test pieces for MD direction evaluation) were obtained from one flat plate-shaped molded product. The test pieces were numbered from 1 to 10, in order from the test piece closest to the left side surface of the flat plate-shaped molded product when the gate was facing up.

Evaluation of Flexural Strength of Molded Products in MD Direction

The flexural strength was measured five times in accordance with ISO 178 using the five plate-shaped test pieces assigned odd numbers of the obtained test pieces for MD direction evaluation. The average value of the obtained measurement values was adopted as the flexural strength of the molded articles. The results are shown in Tables 2 and 3.

[Flexural Strength of Molded Products in TD Direction]
Production of Test Pieces for Evaluation of Molded Product in TD Direction A 120 mm×120 mm portion of the central section of the above flat plate-shaped molded product was used and cut into a shape having a width of 10 mm, a length of 80 mm, and a thickness of 4 mm such that the longitudinal direction was TD and 10 plate-shaped test pieces (test pieces for TD direction evaluation) were obtained from one flat plate-shaped molded product. The test pieces were numbered from 1 to 10, in order from the test piece closest to the gate of the flat plate-shaped molded product.

Evaluation of Flexural Strength of Molded Products in TD Direction

The flexural strength was measured five times in accordance with ISO 178 using five plate-shaped test pieces assigned odd numbers of the obtained test pieces for TD direction evaluation. The average value of the obtained measurement values was adopted as the flexural strength of the molded articles. The results are shown in Tables 2 and 3.

[Charpy Impact Strength of Molded Products in MD Direction]

Using the five MD direction evaluation test pieces assigned even numbers from among the MD direction evaluation test pieces described above, processing was carried out using a notching tool (model A-4, manufactured by Toyo Seiki Co., Ltd.) to cut a 45° V-shaped groove (notch tip radius: 0.25 mm±0.05 mm) with a depth of 2 mm at the central section in the width direction of the plate-shaped test piece in accordance with ISO 2818 and JIS K7144. Using the five obtained notched plate-shaped test pieces, the Charpy impact strength was measured five times in accordance with ISO 179 using a 7.5J hammer. As the Charpy impact strength of the molded articles, the average value of the obtained measured values was adopted. The results are shown in Tables 2 and 3.

[Charpy Impact Strength of Molded Products in TD Direction]

Using the five TD direction evaluation test pieces assigned even numbers from among the TD direction evaluation test pieces described above, processing was carried out using a notching tool (model A-4, manufactured by Toyo Seiki Co., Ltd.) to cut a 45° V-shaped groove (notch tip radius: 0.25 mm±0.05 mm) with a depth of 2 mm at the central section in the width direction of the plate-shaped test piece in accordance with ISO 2818 and JIS K7144. Using the five obtained notched plate-shaped test pieces, the Charpy impact strength was measured five times in accordance with ISO 179 using a 7.5J hammer. As the Charpy impact strength of the molded articles, the average value of the obtained measured values was adopted. The results are shown in Tables 2 and 3.

TABLE 2

|  |  |  | Example 1 | Example 2 | Example 3 | Example 4 |
|---|---|---|---|---|---|---|
| Resin pellets | Resin pellets 1 (LCP1:LCP2:GF1) | Parts by mass | 82 [24:8:50] |  |  |  |
|  | Resin pellets 2 (LCP1:LCP2:GF2) | Parts by mass |  | 72 [16.5:5.5:50] |  |  |
|  | Resin pellets 3 (LCP1:LCP2:GF3) | Parts by mass |  |  | 76 [19.5:6.5:50] | 76 [19.5:6.5:50] |
| Second thermoplastic resin | LCP2 | Parts by mass | 18 | 28 | 24 | 24 |
| Metal salt of higher fatty acid | S1 | phr | 0.04 | 0.04 | 0.04 | 0.04 |

TABLE 2-continued

|  |  |  | Example 1 | Example 2 | Example 3 | Example 4 |
|---|---|---|---|---|---|---|
| Melting and kneading temperature | Plasticizing section | °C. | 300 | 300 | 300 | 300 |
|  | Plunger section | °C. | 360 | 360 | 360 | 360 |
| Flow starting temperature of resin pellets |  | °C. | 311 | 316 | 314 | 314 |
| Flow starting temperature of second thermoplastic resin |  | °C. | 284 | 284 | 284 | 284 |
| Difference in flow starting temperature between resin pellets and second thermoplastic resin |  | °C. | 27 | 32 | 30 | 30 |
| Resin pellet length |  | mm | 12 | 12 | 12 | 9 |
| Length weighted average fiber length of glass fibers in molded products |  | mm | 4.73 | 6.68 | 6.1 | 5.24 |
| Flexural strength | MD direction | MPa | 173 | 155 | 165 | 161 |
|  | TD direction | MPa | 122 | 95 | 92 | 92 |
|  | TD/MD |  | 0.70 | 0.61 | 0.56 | 0.57 |
| Charpy impact strength (with a notch) | MD direction | MPa | 98 | 78 | 105 | 100 |
|  | TD direction | MPa | 83 | 75 | 94 | 75 |
|  | TD/MD |  | 0.84 | 0.97 | 0.9 | 0.75 |

TABLE 3

|  |  |  | Comparative Example 1 | Comparative Example 2 |
|---|---|---|---|---|
| Resin pellets | Resin pellets 4 (LCP1:LCP2:GF4) | Parts by mass | 76 [19.5:6.5:50] |  |
|  | Resin pellets 5 (LCP1:LCP2:GF5) | Parts by mass |  | 81 [23.2:7.8:50] |
| Second thermoplastic resin | LCP2 | Parts by mass | 24 | 19 |
| Metal salt of higher fatty acid | S1 | phr | 0.04 | 0.04 |
| Melting and kneading temperature | Plasticizing section | °C. | 300 | 300 |
|  | Plunger section | °C. | 360 | 360 |
| Flow starting temperature of resin pellets |  | °C. | 312 | 311 |
| Flow starting temperature of second thermoplastic resin |  | °C. | 284 | 284 |
| Difference in flow starting temperature between resin pellets and second thermoplastic resin |  | °C. | 28 | 27 |
| Resin pellet length |  | mm | 12 | 12 |
| Length weighted average fiber length of glass fibers in molded products |  | mm | 6.78 | 5.94 |
| Flexural strength | MD direction | MPa | 154 | 165 |
|  | TD direction | MPa | 49 | 49 |
|  | TD/MD |  | 0.32 | 0.29 |
| Charpy impact strength (with a notch) | MD direction | MPa | 127 | 116 |
|  | TD direction | MPa | 22 | 14 |
|  | TD/MD |  | 0.17 | 0.12 |

From the results shown in Tables 2 and 3, the injection-molded products produced using the resin compositions of Examples 1 to 4 had higher mechanical strength (flexural strength and impact strength) not only in the MD direction but also in the TD direction and the MDTD anisotropy of the mechanical strength was reduced compared to the injection-molded products produced using the resin compositions of Comparative Examples 1 and 2.

From the above, according to the resin composition of the present embodiment, it is possible to confirm that it is possible to further increase the molded article strength and to reduce the MDTD anisotropy of the molded article strength.

Although preferable Examples of the present invention were described above, the present invention is not limited to these Examples. Additions, omissions, substitutions, and other changes to the configurations are possible in a range not departing from the purpose of the present invention. The present invention is not limited by the above description, but only by the scope of the appended claims.

REFERENCE SIGNS LIST

100: Manufacturing apparatus
101 to 109: Transport rolls
120: Extruder
121: Pre-heating section
123: Impregnation section
125: Cooling section
127: Take-up section
129: Cutting section

The invention claimed is:

1. A resin composition comprising:
   resin pellets comprising a first thermoplastic resin and glass fibers; and
   a second thermoplastic resin,
   wherein the first thermoplastic resin and the second thermoplastic resin are both liquid crystal polyester resins,
   the second thermoplastic resin has a lower flow starting temperature than the resin pellets,
   a length weighted average fiber length of the glass fibers is 5.5 mm to 20 mm,
   a denier of the glass fibers in the resin pellets is 500 g/1000 m or more and 3400 g/1000 m or less,
   each of the first thermoplastic resin and the second thermoplastic resin has a repeating unit (1) represented by Formula (1), a repeating unit (2) represented by Formula (2), and a repeating unit (3) represented by Formula (3), and
   a content of the repeating unit (2) is 10 mol % or more and 35 mol % or less with respect to a total amount of the repeating unit (1), the repeating unit (2), and the repeating unit (3), $$-O-Ar^1-CO- \quad (1)$$

$$-CO-Ar^2-CO- \quad (2)$$

$$-X-Ar^3-Y- \quad (3)$$

wherein, $Ar^1$ represents a phenylene group, a naphthylene group, or a biphenylylene group, $Ar^2$ and $Ar^3$ each independently represent a phenylene group, naphthylene group, biphenylylene group, or a group represented by Formula (4), X and Y each independently represent an oxygen atom or an imino group (—NH—), hydrogen atoms in the group represented by $Ar^1$, $Ar^2$, or $Ar^3$ are each independently substituted with a halogen atom, an alkyl group, or an aryl group, $$-Ar^4-Z-Ar^5- \quad (4)$$

wherein, $Ar^4$ and $Ar^5$ each independently represent a phenylene group or a naphthylene group, and Z represents an oxygen atom, a sulfur atom, a carbonyl group, a sulfonyl group, or an alkylidene group.

2. The resin composition according to claim 1, wherein a content of the second thermoplastic resin is 10 parts by mass to 45 parts by mass with respect to 100 parts by mass of a total amount of the resin pellets and the second thermoplastic resin.

3. The resin composition according to claim 1, wherein a number-average fiber diameter of the glass fibers is 10 μm to 20 μm.

4. The resin composition according to claim 1, wherein the content of the repeating unit (2) is 17.5 mol % or more and 35 mol % or less with respect to the total amount of the repeating unit (1), the repeating unit (2), and the repeating unit (3).

5. The resin composition according to claim 1, wherein a content of the repeating unit (1) is 30 mol % or more and 80 mol % or less and a content of the repeating unit (3) is 10 mol % or more and 35 mol % or less with respect to the total amount of the repeating unit (1), the repeating unit (2), and the repeating unit (3).

6. The resin composition according to claim 1, wherein the glass fibers include E-glass.

7. The resin composition according to claim 1, wherein a content of the glass fibers is more than 35 parts by mass and less than 65 parts by mass with respect to 100 parts by mass of a total amount of the resin pellets and the second thermoplastic resin.

8. The resin composition according to claim 7, wherein a content of the second thermoplastic resin is 10 parts by mass to 45 parts by mass with respect to 100 parts by mass of a total amount of the resin pellets and the second thermoplastic resin.

9. A molded article produced from the resin composition according to claim 1.

* * * * *